United States Patent [19]

Fergason

[11] Patent Number: 5,168,380
[45] Date of Patent: * Dec. 1, 1992

[54] MULTIPLE CONTAINMENT MEDIUMS OF OPERATIONALLY NEMATIC LIQUID CRYSTAL RESPONSIVE TO A PRESCRIBED INPUT

[75] Inventor: James L. Fergason, Atherton, Calif.

[73] Assignee: Manchester R & D Partnership an Ohio Limited Partnership, Pepper Pike, Ohio

[ * ] Notice: The portion of the term of this patent subsequent to Nov. 7, 2006 has been disclaimed.

[21] Appl. No.: 817,451

[22] Filed: Jan. 6, 1992

Related U.S. Application Data

[63] Continuation of Ser. No. 522,813, May 14, 1990, Pat. No. 5,107,352, which is a continuation of Ser. No. 244,602, Sep. 14, 1988, abandoned, which is a continuation of Ser. No. 707,486, Mar. 1, 1985, abandoned.

[51] Int. Cl.$^5$ .................. G02F 1/13; G02F 1/133; G02F 1/1343
[52] U.S. Cl. ....................... 359/51; 359/52; 359/53; 359/87; 359/98
[58] Field of Search ............... 359/51, 52, 53, 87, 359/98

[56] References Cited

U.S. PATENT DOCUMENTS

| | | | |
|---|---|---|---|
| 2,777,011 | 1/1957 | Marks | 358/88 |
| 2,897,544 | 8/1959 | Marks | 156/494 |
| 3,300,436 | 1/1967 | Marks et al. | 524/401 |
| 3,322,485 | 5/1967 | Williams | 359/54 |
| 3,341,466 | 9/1967 | Brynko et al. | 427/213.35 |
| 3,551,026 | 12/1970 | Heilmeier | 359/48 |

(List continued on next page.)

FOREIGN PATENT DOCUMENTS

| | | |
|---|---|---|
| 0086447 | 8/1983 | European Pat. Off. . |
| 0157489 | 10/1985 | European Pat. Off. . |
| 2139537 | 1/1973 | France . |
| 52-45894 | 4/1977 | Japan . |

(List continued on next page.)

OTHER PUBLICATIONS

Uchida, "Multicolored Liquid Crystal Displays", *Optical Engineering*, vol. 23, No. 3, May/Jun. 1984, pp. 247-252.

(List continued on next page.)

*Primary Examiner*—Stanley D. Miller
*Assistant Examiner*—Ron Trice
*Attorney, Agent, or Firm*—Renner, Otto, Boisselle & Sklar

[57] ABSTRACT

A liquid crystal color display provides a transmitted light output that is of one or more colors, black, and/or white, as a function of the color of the incident light input and controlled energization or not of respective optically serially positioned liquid crystal color layers and/or multicolor composite liquid crystal color layer(s) in the display. In one case, the display includes a plurality of liquid crystal color layers, each being dyed a different respective color, and apparatus for selectively applying a prescribed input, such as an electric field of a given voltage level or frequency, to a respective layer or layers or to a portion or portions thereof. Each liquid crystal layer includes plural volumes of operationally nematic liquid crystal material in a containment medium that tends to cause an alignment of the liquid crystal structure and, thus, pleochroic dye included or mixed with the liquid crystal material in each layer to absorb light. Each layer is differently colored by the dye so as to have a particular coloring effect on light incident thereon. Exemplary layer colors may be yellow, cyan and magenta, and a multicolor light output can be produced. The containment medium can incorporate cross-linking polymers. The liquid crystal display or apparatus is capable of discriminating voltage and/or frequency magnitude to enable a multicolor response using only a single pair of electrodes. Also, in one embodiment, cross-over liquid crystal having positive to negative dielectric anisotropy characteristics is used.

70 Claims, 3 Drawing Sheets

U.S. PATENT DOCUMENTS

| | | | |
|---|---|---|---|
| 3,565,818 | 2/1971 | Bayless et al. | 428/402.22 |
| 3,578,482 | 5/1971 | Whitaker et al. | 427/259 |
| 3,600,060 | 8/1971 | Churchill et al. | 359/44 |
| 3,627,924 | 12/1971 | Fleming et al. | 358/241 |
| 3,636,244 | 1/1972 | Smierciak et al. | 358/15 |
| 3,639,685 | 2/1972 | Morio | 358/30 |
| 3,666,881 | 5/1972 | Stein | 358/56 |
| 3,703,329 | 11/1972 | Castellano | 359/53 |
| 3,720,623 | 3/1973 | Cartmell et al. | 428/402.2 |
| 3,840,695 | 10/1974 | Fischer | 358/61 |
| 3,864,022 | 2/1975 | Moriyama et al. | 359/84 |
| 3,872,050 | 3/1975 | Benton et al. | 359/101 X |
| 3,992,082 | 11/1976 | Katz | 359/53 |
| 4,009,934 | 3/1977 | Goodwin et al. | 359/84 |
| 4,016,098 | 4/1977 | Saeki et al. | 264/4.3 |
| 4,022,706 | 5/1977 | Davis | 428/1 |
| 4,035,690 | 7/1977 | Roeber | 340/703 |
| 4,048,358 | 9/1977 | Shanks | 428/1 |
| 4,066,568 | 1/1978 | Nakazawa et al. | 427/213.3 |
| 4,150,876 | 4/1979 | Yevick | 359/72 X |
| 4,201,453 | 5/1980 | Kobale et al. | 359/79 |
| 4,211,473 | 7/1980 | Shanks | 359/70 |
| 4,241,339 | 12/1980 | Ushiyama | 340/702 |
| 4,386,836 | 6/1983 | Aoki et al. | 355/210 |
| 4,391,491 | 7/1983 | Freer et al. | 359/74 |
| 4,396,251 | 8/1983 | Mukoh et al. | 359/66 |
| 4,401,537 | 8/1983 | Chern et al. | 522/31 |
| 4,414,131 | 11/1983 | Sethofer et al. | 252/299.1 |
| 4,435,047 | 3/1984 | Fergason | 359/52 |
| 4,448,490 | 5/1984 | Shibuya et al. | 359/53 |
| 4,448,823 | 5/1984 | Clifford | 428/1 |
| 4,449,123 | 5/1984 | Muranaga | 340/716 |
| 4,458,175 | 7/1984 | Weekley | 313/472 |
| 4,460,248 | 7/1984 | Shirai | 359/52 |
| 4,470,668 | 9/1984 | Inoue et al. | 359/80 |
| 4,485,376 | 11/1984 | Noble | 340/716 |
| 4,493,532 | 1/1985 | Kaneko et al. | 359/98 |
| 4,549,174 | 10/1985 | Funada et al. | 340/784 |
| 4,552,437 | 11/1985 | Gantenbrink et al. | 359/67 |
| 4,556,289 | 12/1985 | Fergason | 359/52 |
| 4,574,110 | 3/1986 | Asano et al. | 428/914 X |
| 4,579,423 | 4/1986 | Fergason | 359/52 |
| 4,581,608 | 4/1986 | Aftergut et al. | 340/704 |
| 4,596,445 | 6/1986 | Fergason | 359/49 |
| 4,606,611 | 8/1986 | Fergason | 359/52 |
| 4,610,509 | 9/1986 | Sorimachi et al. | 359/68 |
| 4,613,207 | 9/1986 | Fergason | 359/41 |
| 4,616,903 | 10/1986 | Fergason | 359/52 |
| 4,643,528 | 2/1987 | Bell, Jr. | 359/52 |
| 4,662,720 | 5/1987 | Fergason | 359/52 |
| 4,707,080 | 11/1987 | Fergason | 359/52 |
| 4,708,441 | 11/1987 | Petrzilka et al. | 359/103 |
| 4,834,508 | 5/1989 | Fergason | 359/51 |
| 4,878,741 | 11/1989 | Fergason | 359/51 |

FOREIGN PATENT DOCUMENTS

| | | |
|---|---|---|
| 53-34542 | 3/1978 | Japan . |
| 53-44496 | 3/1978 | Japan . |
| 56-011435 | 2/1981 | Japan . |
| 57-92311 | 6/1982 | Japan . |
| 57-192928 | 11/1982 | Japan . |
| 60-163018 | 8/1985 | Japan . |
| 2003290 | 3/1979 | United Kingdom . |
| 2139393 | 11/1984 | United Kingdom . |

OTHER PUBLICATIONS

Bucher et al. "Frequency-addressed liquid crystal field effect," *Applied Physics Letters*, vol. 25, No. 4, Aug. 15, 1974, pp. 186–188.

Sato et al. "Multicolor fluorescent liquid-crystal display concepts," *Applied Physics Letters*, vol. 37, No. 8 Oct. 15, 1980, pp. 677–679.

Suzuki et al. "A Multiplexed Phase-Change Type Color LCD," *Proceedings of the SID*, vol. 22, No. 4, (1981), pp. 293–297.

Urisu et al. "Liquid crystal display device for total reflection switching with fluorescent dye addition," *Applied Optics*, vol. 20, No. 4, Feb. 15, 1981, pp. 633–635.

Van Meter et al. "Low-Melting Liquid Crystalline Phenyl 4-Benzoyloxybenzoates," *Journal of the American Chemical Society*, vol. 95:2, Jan. 24, 1973.

White et al. "New Absorptive Mode Reflective Liquid-Crystal Display Device," *American Institute of Physics*, vol. 45, No. 11, Nov. 1974, pp. 4718–4723.

Vach et al. "Observation of Intensity-Dependent Guided Waves," *Optical Society of America*, vol. 9, No. 6, Jun. 1984.

Fergason et al. "Polymer Encapsulated Nematic Liquid Crystals for Display and Light Control Applications," *SID85 Digest*, (1985), pp. 68–69.

Gerber, "Two-frequency addressing of a cholesteric texture change electro-optical effect," *Applied Physics Letters*, vol. 44, No. 9, May 1, 1984, pp. 932–934.

Van Doorn et al. "Two-frequency 100-line addressing of a reflective twisted-nematic liquid-crystal matrix display," *Journal of Applied Physics*, vol. 50, No. 2, Feb. 1979, pp. 1066–1070.

Fergason et al. "Polymer Encapsulated Nematic Liquid Crystals for use in High Resolution and Color displays," Taliq Corporation, Mountain View, California (1985).

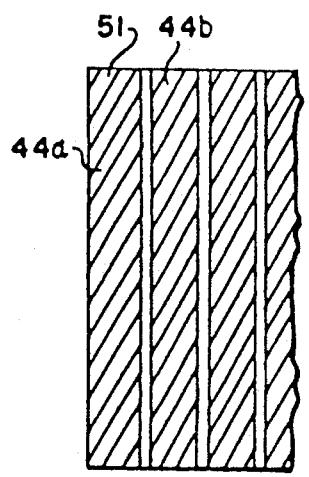
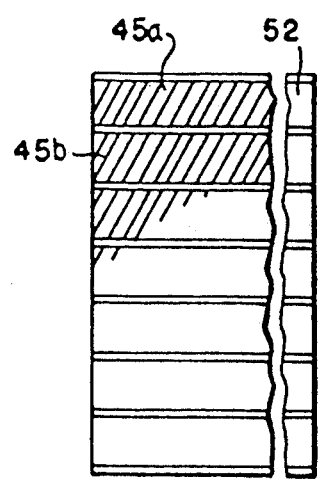
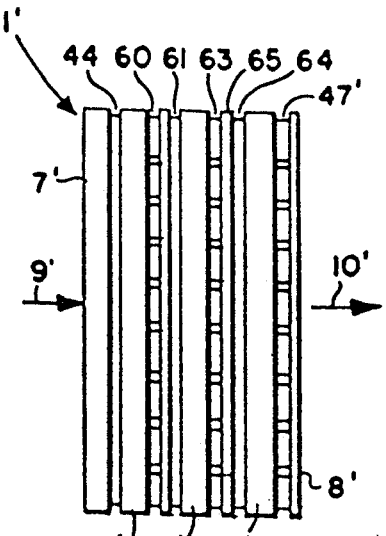
FIG. 7  FIG. 8  FIG. 9
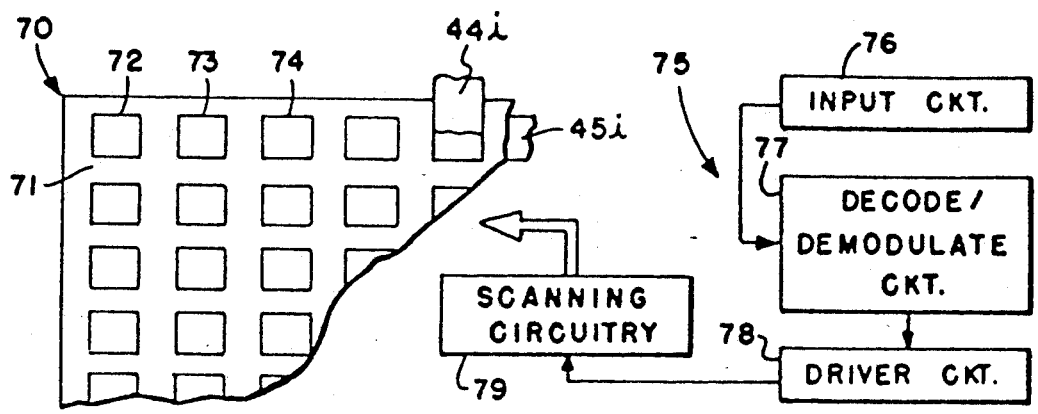
FIG. 10
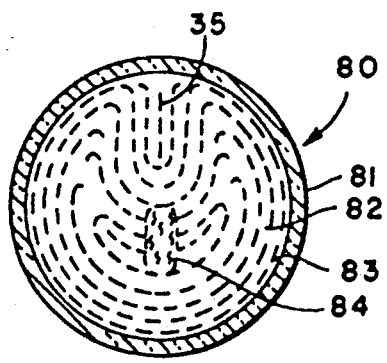
FIG. 11
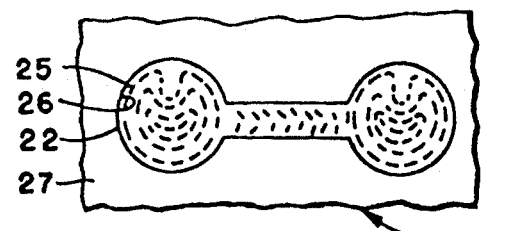
FIG. 12

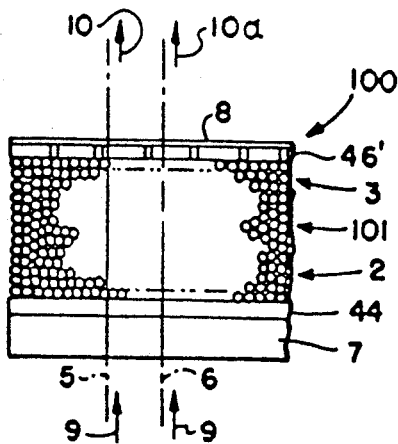
FIG. 13
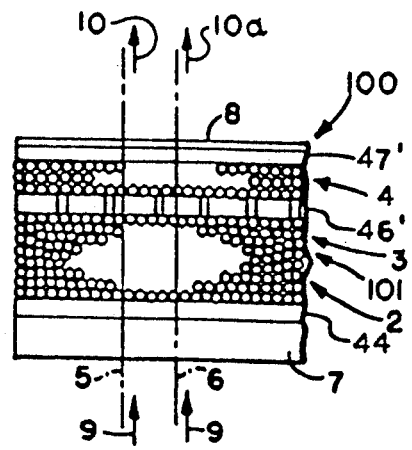
FIG. 14
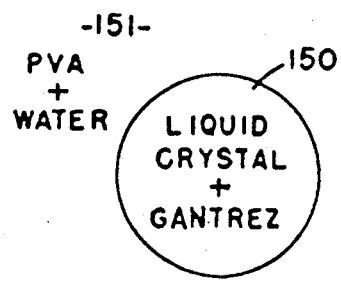
FIG. 15
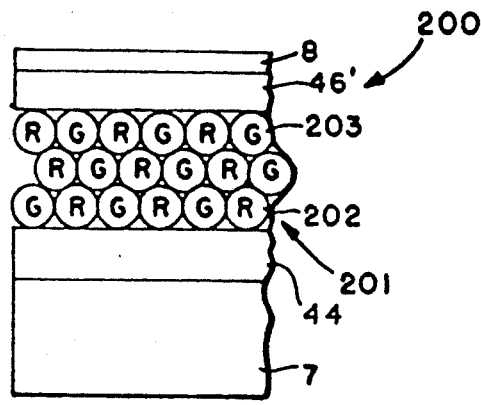
FIG. 16
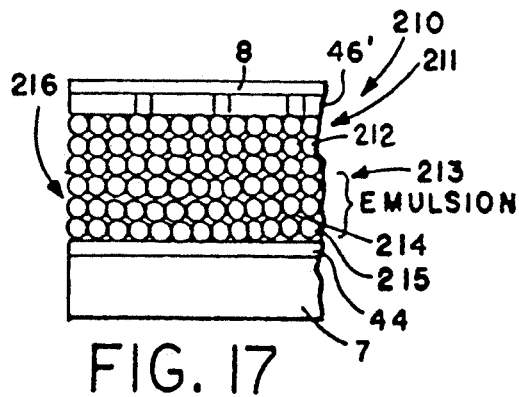
FIG. 17
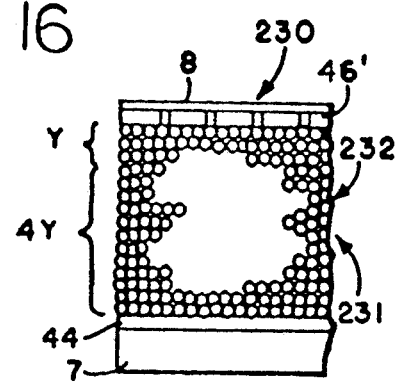
FIG. 19
FIG. 18

MULTIPLE CONTAINMENT MEDIUMS OF OPERATIONALLY NEMATIC LIQUID CRYSTAL RESPONSIVE TO A PRESCRIBED INPUT

This is a continuation of commonly assigned application Ser. No. 07/522,813 filed on May 14, 1990, now U.S. Pat. No. 5,107,352 which is a continuation of U.S. application Ser. No. 07/244,602, filed on Sep. 14, 1988 (now abandoned), which is a continuation of Ser. No. 06/707,486, filed on Mar. 1, 1985 (now abandoned).

CROSS-REFERENCES TO RELATED PATENT AND APPLICATIONS

Reference is made to applicant's U.S. Pat. No. 4,435,047, issued Mar. 6, 1984, and co-pending, commonly assigned U.S. Pat. applications Ser. No. 477,242, filed Mar. 21, 1983, for "Encapsulated Liquid Crystal And Method", now U.S. Pat. No. 4,616,903; Ser. No. 477,138, filed Mar. 21, 1983, for "Enhanced Scattering In Voltage Sensitive Encapsulated Liquid Crystal", now U.S. Pat. No. 4,606,611 Ser. No. 480,461, for "Colored Encapsulated Liquid Crystal Devices Using Imbibition Of Colored Dyes And Scanned Multicolored Displays", now U.S. Pat. No. 4,662,730; and Ser. No. 480,466, for "Colored Encapsulated Liquid Crystal Apparatus Using Enhanced Scattering", now U.S. Pat. No. 4,596,445; both filed Mar. 30, 1983, Ser. No. 585,883, filed Mar. 2, 1984, for "Encapsulated Liquid Crystal Material, Apparatus And Method", now U.S. Pat. No. 4,707,080; and Ser. No. 608,135, filed May 8, 1984, for "Liquid Crystal Projector And Method" now U.S. Pat. No. 4,613,207. The entire disclosures of such patent and applications are hereby incorporated by reference.

TECHNICAL FIELD

The present invention relates generally, as indicated, to liquid crystal color displays and methods, and, more particularly, to the use of subtractive color principles in a multi-layer and/or multicolor liquid crystal display to obtain selected color outputs that may be used to provide a constant or static output image and/or a dynamic or moving image, for example analogous to that produced by a color television. The invention also relates to the scanning, e.g. in the sense of selectively addressing of respective multicolor portions of a liquid crystal color display apparatus to enable the multiple coloring of the light output, e.g. like a color television picture tube.

BACKGROUND

Liquid crystal material currently is used in a wide variety of devices, including, for example, optical devices such as visual displays. A property of liquid crystal enabling use in visual displays is the ability to scatter and/or to absorb light when the liquid crystal is in a random alignment and the ability to transmit light when the liquid crystal is in an ordered alignment.

Examples of electrically responsive liquid crystal material and use thereof are found in the above patent and applications and in U.S. Pat. No. 3,322,485. Certain types of liquid crystal material are responsive to a prescribed input, such as temperature or electrical input (electric field, voltage, frequency), changing the optical characteristics, such as the random or ordered alignment of the liquid crystal material, in response to temperature of the liquid crystal material or electric field voltage and/or frequency applied to the liquid crystal material.

Currently there are three categories of liquid crystal materials, namely cholesteric, nematic and smectic. The present invention preferably uses nematic liquid crystal material or a combination of nematic and some cholesteric type. More specifically, the liquid crystal material preferably is operationally nematic, i.e. it acts as nematic material and not as the other types. Operationally nematic means that in the absence of external fields structural distortion of the liquid crystal is dominated by the orientation of the liquid crystal at its boundaries rather than by bulk effects, such as very strong twists, as in cholesteric material, or layering, as in smectic material. Thus, for example, operationally nematic liquid crystal with chiral ingredients, which induce a tendency to twist but cannot overcome the effects of boundary alignment, still would be operationally nematic. Such material should have a positive dielectric anisotropy; as is described below, the liquid crystal may have both positive and negative dielectric anisotropy, e.g. as a function of frequency. The operationally nematic material may include nematic and cholesteric liquid crystal materials. Although various characteristics of the various liquid crystal materials are described in the prior art, one known characteristic is that of reversibility, e.g. of physical, structural, optical and/or electrical properties, as a prescribed input is applied or removed. Particularly, nematic liquid crystal material is known to be reversible, but cholesteric material ordinarily is not reversible.

Hereinbelow the liquid crystal of the invention primarily will be referred to interchangeably and equivalently as nematic or as operationally nematic.

Usually liquid crystal material is anisotropic both optically (birefringence) and, for example in the case of nematic material, electrically. The optical anisotropy is manifest by the absorption, especially when pleochroic dye is in solution with the liquid crystal material, of light when the liquid crystal material is in random alignment, and the transmission of light, especially in a particular direction related to an axis of the liquid crystal structure, through the liquid crystal material when it is in ordered alignment. The electrical anisotropy may be a relationship between the dielectric constant or dielectric coefficient with respect to the alignment of the liquid crystal material and also may be electrical frequency dependent.

Pleochroic dye also has been used in the past in a mixture with operationally nematic liquid crystal contained in plural volumes in a containment or support medium. Examples are given in several of the applicant's above-identified patent(s) and applications.

In the past, displays using liquid crystal material have had to be relatively small in size for a variety of reasons. Using applicant's invention of providing plural volumes of liquid crystal material in a support or containment medium, relatively large- and small-size displays can be made and operated successfully. The volumes may be discrete ones, may be interconnected with one or more other volumes, or may include both discrete and interconnected ones. Moreover, use of operationally nematic liquid crystal material enables operational response as a function of electrical input and also enables relatively expeditious and efficient operation, for example in response to the application or removal of an electric field.

As used herein with respect to the present invention, encapsulated liquid crystal material, volumes of liquid crystal material in a support or containment medium, etc., means liquid crystal material in capsules, cells or the like formed in or included in a containment medium. The capsules or cells may be discrete, i.e. not fluidically connected to any others, or may be fluidically interconnected with one or more capsules or cells. (The terms volumes, capsules, cells, etc. may be used interchangeably and equivalently herein.) Such liquid crystal material and containment medium may form an emulsion, preferably a stable one, that is able to set or to cure to a relatively stable structure in which the plural capsules, cells or volumes in the structure contain liquid crystal material and preferably also pleochroic dye. Various methods for making and using such encapsulated liquid crystal material and apparatus associated therewith are disclosed herein and in applicant's above patent(s) and applications.

In one preferred embodiment of the invention the containment medium is formed of a latex or latex type material, for example as is disclosed in copending U.S. Pat. application Ser. No. 591,433, filed Mar. 20, 1984, the entire disclosure of which is incorporated by reference. In another preferred embodiment the containment medium is polyvinyl alcohol.

A flat screen television system in which an electroluminescent array is repetitively scanned is disclosed in U.S. Pat. No. 3,627,924. Moreover, U.S. Pat. Nos. 3,636,244 and 3,639,685 disclose signal processing circuits for color television picture tubes. The disclosures of these patents are hereby incorporated by reference.

BRIEF SUMMARY OF INVENTION

Briefly, the invention relates to the producing of a colored output, preferably a multicolored output, by a liquid crystal device that includes pleochroic dye. The liquid crystal device is in the form of a liquid crystal color display that includes at least two different groups of volumes of dyed liquid crystal, the volumes of one group being fluidically and/or chemically separated from the volumes of the other group to isolate the respective dyed liquid crystal of each group from that of the other(s), and the dyed liquid crystal of each group preferably including pleochroic dye of a different respective color. The groups of volumes of dyed liquid crystal material may be in separate respective color layers of plural volumes or the volumes of two or more groups may be mixed substantially homogeneously while maintaining the respective dyed liquid crystal materials isolated from the other differently dyed liquid crystal material. Such mixed volumes embodiment is referred to below as the distributed volumes embodiment whether the volumes are mixed substantially or less than substantially homogeneously. The volumes of dyed liquid crystal material may be in the form of discrete capsules that are isolated totally from other capsules or that are fluidically interconnected to one or more capsules of the same group, or both; alternatively, the volumes may be in the form of an emulsion of the dyed liquid crystal in a containment medium, in the form of a stable matrix of the dyed liquid crystal in a containment medium, and so on.

Whether the groups of dyed liquid crystal volumes are in separate layers of different respective colors or are in a homogeneous distribution of the volumes, the layers and/or volumes are arranged in optical serial relation so that incident light transmitted through the display preferably passes through all or at least several of the liquid crystal color layers or differently dyed volumes. Respective color layers or portions thereof or groups of homogeneously distributed volumes may be selectively energized to substantial optical transparency or deenergized to color light transmitted or passing therethrough. Optical operation of the liquid crystal color display, then, follows the principles of subtractive color filter operation, as is described in greater detail below.

The liquid crystal material in each volume includes pleochroic dye, which tends to align according to the structure of the liquid crystal material. Although the structure of operationally nematic liquid crystal material generally tends to assume a straight line configuration, the walls defining the volumes in which the liquid crystal material and pleochroic dye is contained tend to distort the natural liquid crystal structure to a curvilinear alignment in the absence of a prescribed input, in the preferred embodiment an electric field. The curvilinearly aligned or distorted liquid crystal structure may be in a direction generally parallel to the wall(s) defining the volume(s) or may be generally normal to such wall(s). Such curvilinear alignment may be referred to as a nematic curvilinearly aligned phase of the liquid crystal or liquid crystal structure and in such phase the liquid crystal material and dye tend to affect incident light. More specifically, the dye tends to color the light or to filter out a particular color from the light. On the other hand, in the presence of a prescribed input, preferably an electric field, the liquid crystal structure tends to align with respect to the field, and the pleochroic dye structure aligns generally in parallel with the liquid crystal structure; in such parallel aligned or field-on condition or phase the amount of coloring or filtering of light transmitted through the particular liquid crystal color layer is reduced, preferably is minimized, and most preferably the liquid crystal color layer becomes substantially optically transparent.

In a device utilizing two differently dyed liquid crystal groups of volumes, operation is, as follows: (a) both groups are off, i.e. in curvilinearly aligned phase such that the dye in both groups affects light serially incident thereon, the transmitted light will be filtered by both groups; (b) when one of the groups is on or in parallel aligned mode and the other is curvilinearly aligned, in the former the amount of filtering by dye therein will decrease, and preferably the volumes in such group become clear and in the latter filtering still would continue; and (c) when both groups are on or aligned filtering further decreases, preferably all or nearly all incident light is transmitted.

To apply the prescribed input to the respective liquid crystal volumes or groups of volumes, plural electrodes, for example of optically transparent electrically conductive material, are employed. The electrodes are coupled to an electrical supply that may be manually, automatically, or otherwise controlled to determine whether or not an electric field is to be applied to a liquid crystal color layer or to a portion thereof, the voltage of such field and/or the frequency of the field or applied voltage. The electrical supply or drive may be one that includes multiplex circuitry to scan or to address various portions of a liquid crystal color layer or of multiple liquid crystal color layers.

For the separate color layer embodiments, the electrode arrangement may employ one or more singular shared electrodes, whereby a given electrode is shared using the same to apply electric field to one or both liquid crystal layers on opposite sides of the respective electrode; a non-shared or dedicated electrode, i.e. one used to apply field to only one liquid crystal layer, would usually be required for each outer layer of the liquid crystal display, though. Alternatively, each liquid crystal layer may have dedicated electrodes, and electrical insulating material may be provided between the otherwise relatively adjacent electrodes of relatively adjacent liquid crystal color layers. Moreover, the electrodes may be shared such that plural differently dyed liquid crystal layers are located between a shared pair of electrodes and are discriminatingly responsive to different respective voltage levels or frequencies of the voltage/electric field applied.

For the distributed volumes embodiment, a two-electrode arrangement may be used with the liquid crystal itself or the volumes size providing a function to discriminate between different levels of energization, e.g. voltage or frequency level. For example, different liquid crystal materials may have different voltage threshold requirements; smaller size capsules require a larger voltage field to switch to aligned state relative to that voltage required to switch larger size capsules; and/or the liquid crystal could have a cross-over dielectric anisotropy changing from positive to negative as a function of frequency of applied field or voltage.

Reference hereinafter to a liquid crystal display as used herein generally means a liquid crystal color layer together with the means (preferably electrodes, whether dedicated or shared) for applying a prescribed input (preferably an electric field) to all or portions of the liquid crystal layer. The assemblage of such liquid crystal displays is referred to as a liquid crystal color display in accordance with the invention. Liquid crystal color display also means groups of such distributed volumes of differently dyed liquid crystal and means (preferably also electrodes) for applying a prescribed input to all or portions of the groups of volumes.

According to one aspect of the invention, a liquid crystal apparatus includes at least first and second liquid crystal displays positioned serially in a common optical path to affect incident light directed thereto, each of the displays including plural volumes of liquid crystal which in the absence of a prescribed input at least one of which scatters or absorbs light and which in the presence of such prescribed input reduces the amount of such scattering or absorption, at least some of the liquid crystal in at least one of the displays having pleochroic dye therein for coloring light passing therethrough.

According to another aspect of the invention, a dynamic light coloring device includes a first layer of liquid crystal material in plural volumes in a containment medium, a second layer of liquid crystal material in plural volumes in a containment medium, at least some of the liquid crystal material in at least one of the layers containing pleochroic dye, and an input device for selectively applying a prescribed input to one or more respective portions of respective layers to determine the coloring or not of light transmitted through such respective portion of a respective layer. Preferably each layer includes different colored pleochroic dye; the layers are arranged optically serially; and the liquid crystal color display is operative in an optically subtractive fashion to provide multicolor outputs.

According to an additional aspect of the invention, an adjustable optical color filter includes plural layers of liquid crystal in volumes in a containment medium, at least some of the liquid crystal in at least a portion of at least one of the layers including pleochroic dye, and the layers being optically aligned serially along a path and being selectively operable to affect or not incident light directed along such path.

According to a further aspect of the invention, a method of coloring light includes directing incident light onto a liquid crystal apparatus having plural layers of liquid crystal material in volumes in a containment medium and at least some of the liquid crystal having pleochroic dye therein, such layers being arranged in optical serial relationship with respect to the path of such incident light, and selectively applying a prescribed input to one or more respective portions of at least one of such layers to alter the optical characteristics thereof.

According to still another aspect of the invention, a liquid crystal apparatus includes plural layers of liquid crystal material in plural volumes in a containment medium and electrodes for applying a prescribed input to at least some of such liquid crystal material, the electrodes include at least one electrode shared with at least two of said layers; another aspect is that in which such shared electrode(s) is (are) with liquid crystal layers on opposite sides thereof; another aspect is that in which such shared electrode(s) is (are) with liquid crystal layers on the same side thereof.

According to yet an additional aspect of the invention, a method of affecting light by liquid crystal material includes directing incident light onto a liquid crystal apparatus having plural layers of liquid crystal material in volumes in a containment medium and applying an electric field to one or more portions of each layer thereby to determine the effect thereof on the incident light, the applying step including using at least one electrode shared by plural layers.

According to still another aspect of the invention, a dynamic color image may be created by directing light into a liquid crystal color display including plural layers of liquid crystal material in plural volumes in a containment medium, a plurality of the layers having different respective color characteristics, the layers being oriented in optical series relationship, and applying an electric input to one or more portions of the respective layers to affect the structure and optical characteristics of the liquid crystal material therein.

According to still an additional aspect of the invention, plural layers of differently dyed liquid crystal, preferably operationally nematic liquid crystal, are positioned between a pair of electrodes which apply electrical input to the liquid crystal, the liquid crystal layers being characterized in having different electrical characteristics making possible the separation thereby of a signal from a single pair of electrodes; an additional aspect is that in which such electrical characteristic is voltage level sensitivity; and an additional aspect is that in which such electrical characteristic is electrical frequency sensitivity.

According to even another aspect a cross-linking of materials is employed to establish volume environments for the dyed liquid crystal with secure isolation to minimize the possibility of mixing of one dyed liquid crystal material with another dyed liquid crystal material.

According to even an additional aspect the liquid crystal material is capable of discriminating inputs thereto, for example as a function of the frequency or voltage of an applied field; for frequency discrimination a liquid crystal material having different characteristics as a function of frequency, e.g. a cross-over liquid crystal that has positive dielectric anisotropy below a given frequency and negative dielectric anisotropy above such given frequency, may be used; for voltage discrimination different size volumes of the same liquid crystal may be used, whereby smaller capsules require a larger applied voltage to switch than do larger capsules.

Another aspect relates to a liquid crystal capsule formed by the process of mixing a liquid crystal material with a cross-linking producing material to form a first mixture, mixing with the first mixture a polymer containment medium reactable with the cross-linking producing material of the first mixture to undergo cross-linking.

An additional aspect relates to an optical display including a plurality of liquid crystal capsules of the type defined in the proceding paragraph.

A further aspect relates to an encapsulated liquid crystal including liquid crystal material and a capsule of cross-linked polymer containing therein the liquid crystal material.

Yet another aspect relates to an optical device including an assemblage of groups of volumes of liquid crystal material, one group of volumes including discrete capsules formed by a first containment medium containing therein liquid crystal material and a second group of volumes of liquid crystal in a second containment medium, the capsules being formed of cross-linked polymer containing therein the liquid crystal material.

Yet an additional aspect relates to an optical device including an assemblage of plural groups of volumes of liquid crystal material, a plurality of the volumes formed of discrete capsules formed by containment medium of cross-linked polymer containing therein the liquid crystal material.

Yet a further aspect relates to a method of making liquid crystal capsules comprising the process of mixing a liquid crystal material with a cross-linking producing material to form a first mixture, mixing with the first mixture a polymer containment medium reactable with the cross-linking producing material of the first mixture to undergo cross-linking.

Yet still another aspect relates to an optical apparatus including an assemblage of first volumes of liquid crystal material and second volumes of liquid crystal material, the first volumes having at least one operational characteristic different from the second volumes for discriminating with respect to an electrical input applied to both the first and second volumes.

Yet still an additional aspect relates to an encapsulated operationally nematic liquid crystal including operationally nematic liquid crystal material in a volume defined by a cross-linked polymer.

Yet still a further aspect relates to an optical device including first and second pluralities of volumes of liquid crystal material in a containment medium, each of the first and second pluralities of volumes respectively having a different optical characteristic selectable in response to application and removal of a prescribed input, and each of the first and second pluralities of volumes having a different input responsive characteristic to discriminate at least one parameter of such prescribed input to effect selection of such respective optical characteristics.

These and other objects, aspects, features, and embodiments of the invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIGS. 7 and 8 are, respectively, lefthand and righthand plan views of the liquid crystal color display of FIG. 6 looking generally in the direction of the arrows 7—7 and 8—8 of FIG. 6;

FIG. 9 is a fragmentary enlarged schematic view of an alternate embodiment of liquid crystal color display in accordance with the invention;

FIG. 10 is a schematic view of a flat panel multi-color display system, for example useful in a television type display, according to the present invention;

FIG. 11 is a schematic illustration of a nematic liquid crystal capsule with cholesteric material additive, which may be used with the several embodiments herein;

FIG. 12 is a schematic view of a pair of interconnected capsule volumes useful in the invention;

FIG. 13 is a fragmentary enlarged schematic view of a liquid crystal color display using two different color layers and a single pair of shared electrodes;

FIG. 14 is a fragmentary enlarged schematic view of a liquid crystal color display similar to that of FIG. 13, but using three different color layers and a pair of shared electrodes and an additional electrode;

FIG. 15 is a schematic view of a capsule undergoing formation;

FIG. 16 is a fragmentary enlarged schematic view of a liquid crystal color display using a homogeneous distribution of differently dyed liquid crystal color capsules;

FIG. 17 is a fragmentary enlarged schematic view of a liquid crystal color display using true encapsulated dyed liquid crystal and other dyed liquid crystal material in an emulsion matrix;

FIG. 18 is a fragmentary enlarged schematic view of a liquid crystal color display using two different size capsules in the respective multiple layers thereof; and FIG. 19 is a fragmentary enlarged schematic view of a liquid crystal color display having liquid crystal layers of unequal thickness.

DESCRIPTION OF THE PREFERRED EMBODIMENT

Figure 1:
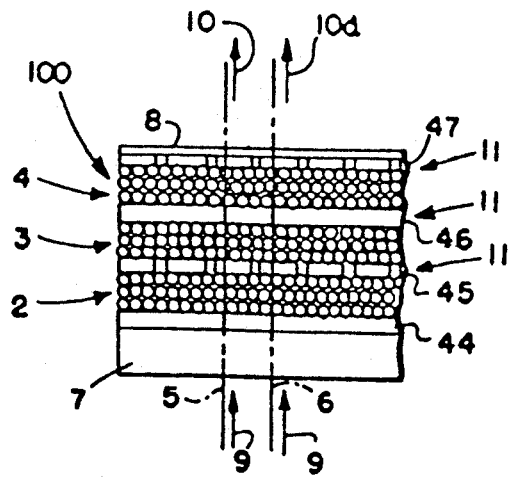
FIG. 1 is a fragmentary enlarged schematic view of a liquid crystal color display according to the invention.

Referring in detail to the drawings, wherein like reference numerals designate like parts in the several figures, and initially to FIG. 1, a liquid crystal color display according to the invention generally is shown at 1. The color display 1 includes three liquid crystal color layers 2, 3, 4 (although more or fewer than three may be used) arranged in optical serial relation relative, for example, to respective optical paths 5, 6 therethrough. The color layers are supported on a common support 7, such as Mylar film, or sheet material, on one side of the color display 1, and a protective material of plastic or other material 8 covers the other side of the color display 1. The color display 1 works in response to the selective application or not of a prescribed input to transmit or not with or without coloring the same incident light 9 to derive output light 10, 10a. To apply such prescribed input which preferably is an electric field, the color display 1 employs plural electrodes 11. Depending on the responsiveness of the liquid crystal thereto, the prescribed input may be other than an electric field.

By selectively energizing or not respective electrodes 11, incident light 9, for example white light, may be transmitted as white, colored, or black (no transmission/full absorption) output light 10, 10a. Absent an electric field the liquid crystal in a given color layer is distorted or curvilinearly aligned, as is the dye therein, and such layer then acts as a color filter according to the color of the dye therein. Therefore, when multiple layers are in the light absorbing/optical filtering state, such layers filter in a subtractive filtering sense the transmitted light. On the other hand, in the presence of an electric field a given liquid crystal color layer becomes substantially optically transparent and non-filtering as the liquid crystal structure and dye aligns with respect to the field.

Figure 2:
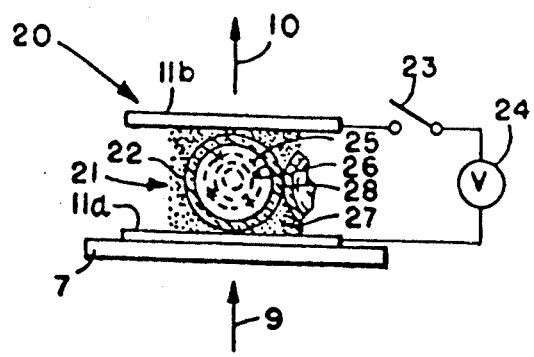
FIG. 2 is a schematic fragmentary representation of a liquid crystal display, which is a portion of the liquid crystal color display in accordance with the present invention.

Details of the invention are now described. Turning to FIG. 2, an example of a liquid crystal display used according to the invention is represented at 20. The display 20 may be considered the fundamental building block of which the liquid crystal color display described in greater detail below is formed.

Figure 3:
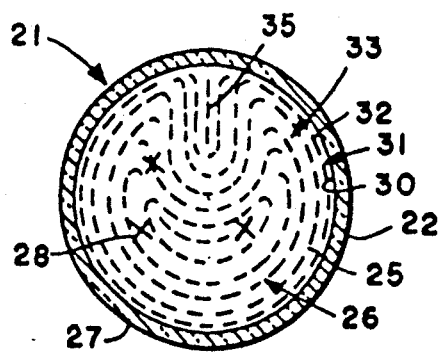
FIGS. 3 and 4 are enlarged schematic illustrations of liquid crystal capsules in accordance with the present invention respectively showing curvilinear alignment of the liquid crystal structure in parallel and normal relation to the capsule wall under a no-field or field-off condition.
Figure 4:
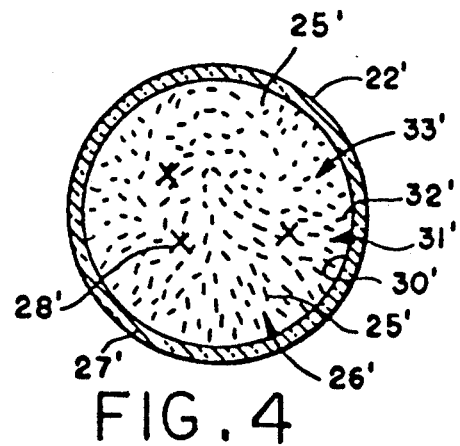
Figure 5:
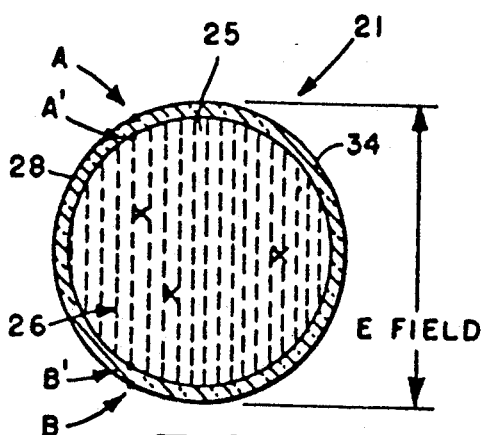
FIG. 5 is an enlarged schematic illustration of a liquid crystal capsule of the type shown in FIGS. 3 and 4 but with the capsule in the presence of an electric field and the liquid crystal structure aligned with respect to the field.

The schematically illustrated liquid crystal display 20 includes encapsulated liquid crystal material 21 represented by a single complete capsule 22 and part of another capsule in FIG. 2, and representative individual capsules in FIGS. 3, 4 and 5, too. Although the capsules illustrated in the drawings are shown in two dimensions and, therefore, planar form, it will be appreciated that the capsules are three dimensional, most preferably approximately spherical. Also, although the capsules 22 are shown in a single layer between electrodes 11a, 11b, there may be more than one layer of capsules of similarly dyed liquid crystal material in a containment medium between the electrodes and/or there may be plural layers of differently dyed encapsulated liquid crystal between the electrodes, as is described in greater detail below.

The capsule 22 (FIG. 2) is shown mounted on a preferably transparent support medium 7, such as Mylar film or sheet material. The liquid crystal display 10 also includes the pair of electrodes 11a, 11b for applying an electric field across the liquid crystal material when a switch 23, for example, is closed to energize the electrodes from a conventional voltage source represented at 24. The electrodes 11a, 11b preferably are optically transparent and may be formed of conventional materials, as is well known in the art. The electrode 11a, moreover, may be applied to the support 7, as is the case, for example, with conventional Intrex film (a Mylar film support with an electrode material coating one surface thereof). The electrode 11b may be applied by vacuum deposition, printing, or any other applicable technique that provides the desired optical and electrical characteristics. Exemplary electrode materials include indium tin oxide, tin oxide, and antimony doped tin oxide. The electrodes are relatively thin, for example, about 200 angstroms thick and are adequately transparent so that they preferably do not significantly affect the optics of the liquid crystal display 20.

The capsule 22 illustrated in FIG. 2, for example, may be one of many capsules that are discretely formed or, more preferably, that are formed by mixing the liquid crystal material with a so-called encapsulating material or containment medium to form an emulsion, preferably a stable one. The emulsion may be applied to the electrode covered support 7 after which the electrode 11b is applied. If desired, the support medium 7 and the encapsulating material or containment medium may be the same material, whereby the emulsion, upon curing, provides adequate self-support and containment of a plurality of volumes of liquid crystal material therein, thus forming the capsules 22.

The encapsulated liquid crystal material 21 includes liquid crystal 25 contained within the confines or interior volume 26 of a capsule 22. Each capsule 22 may be a discrete one or alternatively the liquid crystal 25 may be contained in a stable emulsion of a containment medium or so-called encapsulating material 27 that tends to form a multitude of capsule-like environments for containing the liquid crystal material. The capsules 22 may be fluidically isolated from each other or may be fluidically interconnected with one or more capsules. The encapsulated liquid crystal material 21, including a plurality of volumes 26 of liquid crystal material 25, may be formed of one or both of isolated discrete capsules/volumes and interconnected ones.

As the liquid crystal display 20 is one of the building blocks of the liquid crystal color display 1 according to the invention, pleochroic dye represented at 28 in the capsule 22 is included with the liquid crystal 25. The pleochroic dye 28 is represented by "X"-like markings in the capsule; only several such markings are shown in the various figures, but it will be appreciated that the same represent appropriate amounts of pleochroic dye to effect the desired coloring described in greater detail below. The pleochroic dye has a characteristic of aligning generally in parallel with the liquid crystal structure with which it is mixed. Accordingly, when the liquid crystal material is in the curvilinearly aligned phase, the pleochroic dye 28 likewise will be in such distorted or curvilinearly aligned structural configuration; and when the liquid crystal structure is aligned with respect to an electric field, the pleochroic dye 28 will align in parallel with the liquid crystal material and, accordingly, with respect to the field. Therefore, in the description herein directed to various alignments or distortions of the liquid crystal structure, such description will be applicable similarly to the pleochroic dye 28.

Although the preferred shape of the capsule 22 is spherical, shapes other than spherical may be employed in the invention. The shape should provide the desired optical and electrical characteristics that will satisfactorily coact with the optical characteristics of the liquid crystal material 25, e.g. index of refraction, and will permit an adequate portion of the electric field to occur across the liquid crystal 25 itself for effecting desired ordered or parallel alignment of the liquid crystal when it is desired to have a field-on condition. The capsule shape also should tend to distort the liquid crystal structure when in a curvilinearly aligned phase or field-off or random alignment condition. A particular advantage to the preferred spherical configuration of the capsule 22 is the distortion it effects on the liquid crystal structure when in a field-off condition. This distortion is due, at least in part, to the relative sizes of the capsules and the pitch of the liquid crystal; they preferably are about the same or at least about the same order of magnitude. Moreover, nematic and operationally nematic liquid crystal material have fluid-like properties that facilitate the conformance or the distortion thereof with respect to the shape of the capsule wall, more particularly the wall surface, in the absence of an electric field. On the other hand, in the presence of an electric field, such nematic or operationally nematic material will relatively easily change to ordered alignment with respect to the field.

Liquid crystal material of a type other than nematic or combinations of various types of liquid crystal material and/or other additives may be used with or substituted for the preferred nematic or operationally nematic liquid crystal as long as the end result is an operationally nematic material. However, cholesteric and smectic liquid crystal materials generally are bulk driven, and because it is difficult to break up the bulk structure thereof for conformance to a capsule wall and to the energy considerations in the capsule, such materials are generally not preferred in the invention.

Operationally, the liquid crystal display 20 is intended when in the field-on condition to transmit incident light 9 therethrough without or substantially without affecting the light, and when in a field-off condition also to transmit the incident light 9 or at least to transmit a given color or colors of the incident light while filtering out or absorbing a given color and, therefore, not transmitting such absorbed color. Thus, the intensity and color characteristics of the transmitted light output 10 from the liquid crystal display 20 will be a function of the presence or absence of an electric field and the magnitude of any present electric field as well as of the other optical and electrical characteristics of the liquid crystal material, pleochroic dye, containment medium, and electrodes.

Turning to FIGS. 3, 4 and 5, a schematic representation of the single capsule 22 (22' in FIG. 4; primed reference numerals in FIG. 4 represent elements that are functionally and structurally generally the same as those identified by unprimed reference numerals in FIGS. 3 and 5) containing liquid crystal 25 is shown, respectively, in the field-off (FIGS. 3 and 4) and field-on (FIG. 5) conditions. The capsules 22 are spherical and have a generally smooth curved interior wall surface 30 defining the boundary for the volume 26. The actual dimensional parameters of the wall surface 30 and of the overall capsule 22 are related to the quantity of liquid crystal 25 contained therein and possibly to other characteristics of the individual liquid crystal material therein. Additionally, the capsule 22 applies a force to the liquid crystal 25 tending to pressurize or at least to maintain substantially constant the pressure within the volume 26.

As a result of the foregoing, and due to the surface wetting nature of the liquid crystal, referring particularly to FIG. 3, the liquid crystal, more particularly the liquid crystal structure, which ordinarily in free form would tend to be parallel, although perhaps randomly distributed, is distorted to curve in a direction that generally is parallel to a relatively proximate portion of the interior wall surface 30. Due to such distortion the liquid crystal material may store elastic energy. For simplicity of illustration, a layer 31 of liquid crystal molecules whose directional orientation is represented by respective dashed lines 32 is shown in closest proximity to the interior wall surface 30. The directional orientation of the liquid crystal molecules 32, more particularly the structure thereof, is distorted to curve in the direction that is parallel to a proximate area of the wall surface 30. The directional pattern of the liquid crystal molecules away from the boundary layer 32 within the capsule is represented by 33. The liquid crystal molecules are directionally represented in layers, but it will be appreciated that the molecules themselves are not confined to such layers. Thus, the organization in an individual capsule is predetermined by the organization of the structure 32 at the wall and is fixed unless acted on by outside forces, e.g. an electric field. On removal of the electric field the directional orientation would revert back to the original one, such as that shown in FIG. 3.

As is seen in FIG. 3, the liquid crystal 25 in the capsule 22 has a discontinuity 35 in the generally spherical orientation thereof due to the inability of the liquid crystal to align uniformly in a manner compatible with parallel alignment with the wall 30 and a requirement for minimum elastic energy. Such discontinuity is in three dimensions and is useful to effect a distorting of the liquid crystal 25 further to decrease the possibility that the liquid crystal 25 would be sensitive to optical polarization direction of incident light. The discontinuity protrusion 35 would tend to cause scattering and absorption within the capsule, and the tangential or parallel alignment of the liquid crystal molecules with respect to portions of the interior wall surface 30 of the capsules both cause scattering and absorption within the capsule 22. When the electric field is applied, for example, as is shown in FIG. 5, the discontinuity will no longer exist so that such discontinuity will have a minimum effect on optical transmission when the encapsulated liquid crystal 21 is in a field-on or aligned condition.

Although the foregoing discussion has been in terms of a homogeneous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel direction of orientation of the liquid crystal structure in the absence of an electric field. It is this strongly curved orientation that results in the scattering, polarization insensitivity and, in particular, color filtering by the pleochroic dye, in the field-off condition, which is a feature of this invention.

Briefly referring to FIG. 4 in particular, there is shown an alternate embodiment of encapsulated liquid crystal material 21', which may be substituted for the various other embodiments of the invention disclosed herein. The encapsulated liquid crystal material 21' includes operationally nematic liquid crystal material 25' in the volume 26' of a capsule 22' having preferably a generally spherical wall 30'. In FIG. 4 the material 21' is in field-off condition, and in that condition the structure 33' of the liquid crystal is oriented to be normal or substantially normal to the wall 30' at the interface therewith. Thus, at the interface the structure 33' is generally oriented in a radial direction with respect to the geometry of the capsule 22'. Moving closer toward the center of the capsule 22', the orientation of the structure 33' of at least some of the liquid crystal will tend to curve in order to utilize, i.e. to fill, the volume of the capsule 22' with a substantially minimum free energy arrangement of the liquid crystal in the capsule, for example, as is seen in the drawing.

Such generally radial or normal (i.e. to the capsule wall 30') alignment of FIG. 4 is believed to occur due to the addition of an additive to the liquid crystal material 25' which reacts with the support medium to form normally oriented steryl or alkyl groups at the inner capsule wall. More particularly, such additive may be a chrome steryl complex or Werner complex that reacts with the support, containment or encapsulating medium that forms the capsule wall 30' to form a relatively rigid crust or wall with a steryl group or moiety tending to protrude radially into the liquid crystal material itself. Such protrusion tends to effect the noted radial or normal alignment of the liquid crystal structure. Moreover, such alignment of the liquid crystal material still complies with the above strongly curved distortion of the liquid crystal structure in field-off condition because the directional derivatives taken at right angles to the general molecular direction are non-zero.

Nematic type material usually assumes a parallel configuration and usually is optical polarization direction sensitive. However, since the material 32, 32' in the encapsulated liquid crystal 21, 21' is distorted or forced to curved form in the full three dimensions of the capsule 22, 22', such nematic liquid crystal material in such capsule takes on an improved characteristic of being insensitive to the direction of optical polarization of incident light. The inventor has discovered, moreover, that when the liquid crystal material 25 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the individual liquid crystal molecules 32.

In the field-on condition, or any other condition which results in the liquid crystal and pleochroic dye being in ordered or parallel alignment, as is shown in FIG. 5, the encapsulated liquid crystal 21 will transmit substantially all the light incident thereon and will tend not to be visible in the encapsulating medium 27. On the other hand, in the field-off condition when the liquid crystal and pleochroic dye is in distorted alignment or curvilinearly aligned phase, sometimes referred to herein as random alignment, for example as is shown in FIGS. 3 or 4, some of the incident light will be absorbed by the dye to affect the color of the light output 10.

The index of refraction of the encapsulating medium 27 and the ordinary index of refraction of the liquid crystal 25 should be matched as much as possible when in the field-on or liquid crystal orderly aligned condition to avoid optical distortion due to refraction of incident light passing therethrough. However, when the liquid crystal material is in distorted or random alignment, i.e. there is no field applied, there will be a difference in the indices of refraction at the boundary of the liquid crystal 25 and wall of capsule 22; the extraordinary index of refraction of the liquid crystal is greater than the index of refraction of the encapsulating medium. Such occurrence of different indices of refaction is known as birefringenece. Principles of birefringence are described in *Optics* by Sears and in *Crystals And The Polarizing Microscope* by Hartshorne and Stewart, the relevant disclosures of which are hereby incorporated by reference. Preferably the encapsulating or containment medium 27 and the support medium 7 have the same index of refraction to appear optically substantially as the same material, thus avoiding a further optical interface.

Maximum contrast results when the ordinary index of refraction matches the index of refraction of the medium. The closeness of the index matching will be dependent on the desired degree of contrast and transparency in the device, but the ordinary index of refraction of the liquid crystal and the index of the medium will preferably differ by no more than 0.03, more preferably 0.01, especially 0.001. The tolerated difference will depend upon capsule size.

According to the preferred embodiment and best mode, desirably the electric field E shown on FIG. 5 is applied to the liquid crystal 25 in the capsule 22 for the most part rather than being dissipated or dropped substantially in the encapsulating material. There should not be a substantial voltage drop across or through the material of which the wall 34 of the capsule 22 is formed; rather, the voltage drop should occur across the liquid crystal 25 within the volume 26 of the capsule 22.

The electrical impedance of the encapsulating medium preferably should in effect be large enough relative to that of the liquid crystal in the encapsulated liquid crystal 21 that a short circuit will not occur exclusively through the wall 34, say from point A via only the wall to point B, bypassing the liquid crystal. Therefore, for example, the effective impedance to induced or displacement current flow through or via only the wall 34 from point A to point B should be greater than the impedance that would be encountered in a path from point A to point A' inside the interior wall surface 30, through the liquid crystal material 25 to point B' still within the volume 26, ultimately to point B again. This condition will assure that there will be a potential difference between point A and point B. Such potential difference should be large enough to produce an electric field across the liquid crystal material that will tend to align the same. It will be appreciated that due to geometrical considerations, namely the length through only the wall from point A to point B, for example, such condition still can be met even though the actual impedance of the wall material is lower than that of the liquid crystal material therein.

The dielectric constant of the material of which the encapsulating medium is formed and the dielectric coefficients of the material of which the liquid crystal is comprised, and the effective capacitance values of the capsule wall 34, particularly in a radial direction and of the liquid crystal across which the electric field E is imposed, all should be so related that the wall 34 of the capsule 22 does not substantially drop the magnitude of the applied electric field E. Ideally the capacitance dielectric constants (coefficients) of the entire layer of encapsulated liquid crystal material should be substantially the same for the field-on condition.

The liquid crystal 25 will have a dielectric constant value that is anisotropic. It is preferable that the dielectric constant of the wall 34 be no lower than the dielectric coefficient of the anisotropic liquid crystal material 25 to help meet the above conditions for optimum operation. It is desirable to have a relatively high positive dielectric anisotropy in order to reduce the voltage requirements for the electric field E. The differential between the dielectric constant (coefficient) for the liquid crystal 25 when no electric field is applied, which should be rather small, and the dielectric constant (coefficient) for the liquid crystal when it is aligned upon application of an electric field, which should be relatively large, should be as large as possible. The dielectric constants (coefficients) relationships are discussed in the above patent and applications, the entire disclosures of which are specifically incorporated by reference here. It should be noted in particular, though, that the critical relationship of dielectric values and applied electric field should be such that the field applied across the liquid crystal material in the capsule(s) is adequate to cause alignment of the liquid crystal structure with respect to the field and is not short circuited through the encapsulating medium 27 to bypass the liquid crystal. The lower dielectric values of commonly used liquid crystals are, for example, from as low as about 3.5 to as high as about 8.

The capsules 22 may be of various sizes. The smaller the size, though, the higher the requirements will be for the electric field to effect alignment of the liquid crystal in the capsule. Preferably, though, the capsules should be of uniform size parameters so that the various characteristics, such as the optical and electrical characteristics, of an apparatus, such as a display, using the encapsulated liquid crystal will be substantially uniform. Moreover, the capsules 22 should be at least 1 micron in diameter so they appear as discrete capsules or volumes relative to an incident light beam; a smaller diameter would result in the light beam "seeing" the capsules as a continuous homogeneous layer and would not undergo the required isotropic scattering. Examples of capsule sizes, say from 1-30 microns diameter, and of liquid crystal material are in the above concurrently filed application and are hereby specifically incorporated by reference.

A preferred liquid crystal material in accordance with the best mode of the invention is one like nematic material NM-8250, an ester that was sold by American Liquid Xtal Chemical Corp., Kent, Ohio, U.S.A. Other examples may be ester combinations, biphenyl and/or biphenyl combinations, and the like.

Several other types of liquid crystal material useful according to the invention are disclosed in Table I (items 1-4) below and include the following four examples, each being a recipe for the respective liquid crystal materials. The so-called 10% material (item 1 in the table) has about 10% 4-cyano substituted materials; the 20% material has about 20% 4-cyano substituted materials, and so on.

TABLE 1

1. 10% Material

| | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylheptyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 9.94 grams |
| Cyanophenylmethoxy Benzoate | 0.35 grams |
| 2. 20% Material | |
| Pentylphenylmethoxy Benzoate | 48 grams |
| Pentylphenylpentyloxy Benzoate | 32 grams |
| Cyanophenylpentyl Benzoate | 5.17 grams |
| Cyanophenylheptyl Benzoate | 7.75 grams |
| Cyanophenylpentyloxy Benzoate | 2.35 grams |
| Cyanophenylheptyloxy Benzoate | 2.12 grams |
| Cyanophenyloctyloxy Benzoate | 1.88 grams |
| Cyanophenylmethoxy Benzoate | 0.705 grams |
| 3. 40% Material | |
| Pentylphenylmethoxy Benzoate | 36 grams |
| Pentylphenylpentyloxy Benzoate | 24 grams |
| Cyanophenylpentyl Benzoate | 10.35 grams |
| Cyanophenylheptyl Benzoate | 15.52 grams |
| Cyanophenylpentyloxy Benzoate | 4.7 grams |
| Cyanophenylheptyloxy Benzoate | 4.23 grams |
| Cyanophenyloctyloxy Benzoate | 3.76 grams |
| Cyanophenylmethoxy Benzoate | 1.41 grams |
| 4. 40% MOD | |
| Pentylphenylmethoxy Benzoate | 36 grams |
| Pentylphenylpentyloxy Benzoate | 24 grams |
| Cyanophenylpentyl Benzoate | 16 grams |
| Cyanophenylheptyl Benzoate | 24 grams |

The encapsulating medium forming respective capsules 32 should be of a type that is substantially completely unaffected by and does not affect the liquid crystal material. Various resins and/or polymers may be used as the encapsulating medium. A preferred encapsulating medium is polyvinyl alcohol (PVA), which has a good, relatively high, dielectric constant and an index of refraction that is relatively closely matched to that of the preferred liquid crystal material. An example of preferred PVA is an about 84% hydrolized resin, molecular weight of at least about 1,000. Use of a PVA of Monsanto Company identified as Gelvatol 20/30 represents the best mode of the invention. Latex is another preferred encapsulating medium.

A method for making emulsified or encapsulated liquid crystals 11 may include mixing together the containment or encapsulating medium, the liquid crystal material, and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 21 may not be a perfect sphere, each capsule will be substantially spherical in configuration because a sphere is the lowest free energy state of the individual droplets, globules or capsules of the emulsion, both when originally formed and after drying and/or curing.

The capsule size (diameter) preferably should be uniform in the emulsion for uniformity of operation with respect to effect on incident light and response to electric field. Exemplary capsule size range may be from about 0.3 to about 100 microns, preferably 0.3 to 30 microns, especially 3 to 15 microns, for example 5 to 15 microns.

An example of an acid type containment medium useful in the invention is Carbopol (carboxy polymethylene polymer by B. F. Goodrich Chemical Company), or polyacid.

In accordance with the invention, several different polymer containment media that may be used are listed in Table II below. Table II also indicates several characteristics of the respective polymers.

TABLE II

| Containment Medium | Viscosity | % Hydrolyzed | Molecular Weight | Temperature & % Solutions |
|---|---|---|---|---|
| 20/30 Gelvatol, by Monsanto Company | 4–6 CPS | 88.7–85.5 | 10,000 | 4% at 20° C. |
| 40/20 Gelvatol, by Monsanto Company | 2.4–3 CPS | 77–72.9 | 3,000 | 4% at 20° C. |
| 523, by Air Products And Chemicals, Inc. | 21–25 | 87–89 | — | 4% at 20° C. |
| 72/60 Elvanol, by Du Pont Co. | 55–60 | 99–100 | — | 4% at 20° C. |
| 405 Poval, by Kurashiki | 2–4 CPS | 80–82 | — | 4% at 20° C. |

Other Gelvatol PVA materials that may be used include those designated by Monsanto as 20-90; 9000; 20-60; 6000; 3000; and 40-10.

A preferred quantity ratio of liquid crystal material to containment medium is about one part by weight liquid crystal material to about three parts by weight of containment medium. Acceptable encapsulated liquid crystal emulsion operative according to the invention also may be achieved using a quantity ratio of about one part liquid crystal material to about two parts containment medium, e.g., Gelvatol PVA. Moreover, although a 1:1 ratio also will work, generally it will not function quite as well as material in the ratio range of from about 1:2 to about 1:3.

Various techniques may be employed to form the support medium 7, which may be of the same or similar material as the encapsulating or containment medium. For example, the support medium 7 may be formed using a molding or casting process. The electrode 11a and liquid crystal material may be applied for support by that medium 7. The electrode 11b may be applied, e.g. by printing. Thereafter, an upper support medium or protective cover portion 8 (FIG. 1) may be poured or cast in place to complete enclosing the encapsulated liquid crystal material and the electrodes if desired. Alternatively, the support medium portion 7 may be a substantially transparent plastic-like film, e.g. Mylar, or a plate of glass.

In accordance with the invention, other types of support media 7 that may be used include polyester materials; and polycarbonate material, such as Kodel film. Tedlar film, which is very inert, also may be used if adequate adhesion of the electrode can be accomplished. Such media 7 preferably should be substantially optically transparent.

In a sense the support medium may be considered as that which supports the liquid crystal material. Accordingly, the support medium may be broadly construed as including or being formed by the containment medium; in such sense the support medium may also be construed as possibly, but not necessarily, including an additional material, e.g. Mylar material 7. In the illustrated preferred embodiment and best mode, though, there is a liquid crystal material, a containment medium which contains the liquid crystal material and provides the surface to effect the desired structure distortion, and a support on which the liquid crystal material and containment medium are supported.

A liquid crystal color display is generally indicated at 1 in FIGS. 1 and 6-8. As shown, the display 1 includes three liquid crystal color layers 2, 3, 4, and four electrode layers 44–47 (generally 11 in FIG. 1). Each liquid crystal color layer is sandwiched between a pair of electrode layers. The color layers 2, 3, 4 are arranged in a so-called optical serial relation such that incident light represented by the arrow 9 traveling along an optical path or a light path can travel through all three layers and emerge from the display 1 as transmitted light represented by arrow 10. However, if desired, the display 1 may include more or fewer than the illustrated three color layers 2, 3, 4 arranged in such optical serial relation. Moreover, in an alternate embodiment the liquid crystal color layers may be staggered and one or more of them may be less than fully coextensive over the full input plane 50 of the liquid crystal color display 1, whereby in any given optical path through the display 1, for example the optical path represented by the arrows 9 and 10, only two, in any event less than all, of the liquid crystal color layers would appear in such path.

Figure 6:
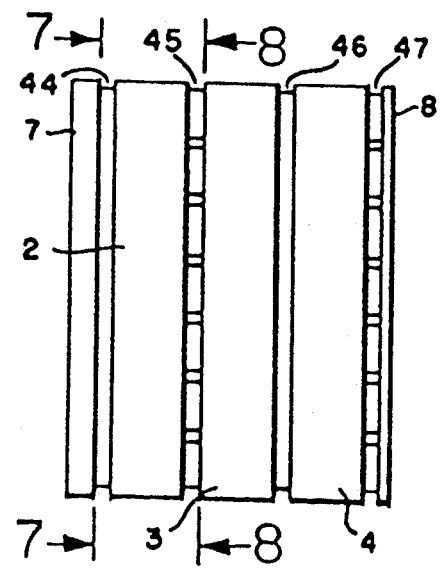
FIG. 6 is a side elevation or section view of a multi-layer liquid crystal color display in accordance with the preferred embodiment and best mode of the invention.

Each of the electrode layers 44, 45, 46 and 47 shown in FIG. 6 is energizable, preferably on a selective basis, to apply an electrical input, preferably an electric field, across a portion of a respective liquid crystal color layer sandwiched therebetween. Each electrode layer, such as the layer 44 shown in plan elevation view in FIG. 7, includes a plurality of electrode strips, such as those designated 44a, 44b, etc. (Electrode, electrode layer, and electrode strip may be used interchangeably herein, for example depending on context.) To facilitate the selective application of an electric field to different respective portions of each of the liquid crystal color layers, the electrodes in relatively adjacent layers are orthogonally related or are otherwise oriented in nonparallel (not 0° or 180°) relation. Accordingly, as is seen in FIG. 7, the electrode layer 44 is formed of a plurality of vertical electrode strips 44a, 44b; the electrode layer 45, on the other hand, is formed of a plurality of horizontal electrode strips 45a, 45b, etc., as is illustrated in FIG. 8. Likewise, the electrode layer 46 is formed of vertical strips like those shown in FIG. 7, and the electrode layer 47 is formed of horizontal electrode strips like those shown in FIG. 8. The arrangement of electrode strips in the electrode layers permits selective application or not of an electric field to respective portions of the liquid crystal color layer between a pair of electrodes. Thus, for example, if the electrode strips 44a, 45a had applied thereto appropriate electrical energization, the same would be effective to apply an electric field across a section of the liquid crystal color layer 2 that is essentially aligned and essentially directly between the electrode strips 44a, 45a, the approximate size of the section of liquid crystal color layer 2 being so energized being represented, for example, by the dashed line-bounded rectangle 51 in the upper left corner of the illustration in FIG. 7 and by a portion 52 shown in the upper right hand quadrant of the illustration in FIG. 8. It will be appreciated that by appropriately energizing respective pairs of electrodes in adjacent layers, various portions of a liquid crystal color layer sandwiched therebetween can have an electric field selectively applied thereto. If desired, one or both of the electrode layers on opposite sides of a liquid crystal color layer may be formed of a solid electrode, electrode strips or portions arranged in a pattern other than those illustrated in FIGS. 6–8, etc., depending on the desired use and operation of the liquid crystal color display 1.

Turning briefly back to FIG. 1, the liquid crystal color layers 2, 3, 4 and the electrode layers 44–47 are illustrated in greater detail. The display 1, including such layers, is mounted on a support 7, such as a Mylar, Plexiglass, glass, or other preferably optically transparent material, and a protective layer of preferably optically transparent material 8, such as Mylar sheet, is provided above the electrode layer 47. As is seen in FIG. 1, each of the liquid crystal color layers 2, 3, 4 is formed of encapsulated liquid crystal material 21 arranged such that a plurality of capsule-like volumes 26 in capsules 22 are provided in each layer. The capsules 22 in the given liquid crystal color layer, such as that shown at 2, may be arranged in an orderly stacked layer arrangement, may be close-packed, may be randomly distributed, etc. The thickness of a given layer should be adequate to enable the encapsulated liquid crystal material 21 therein when in a field-off condition to affect light incident thereon and transmitted therethrough and should be adequately thin to permit substantial optical transparency when in a field-on condition.

To achieve the desired color response of the display 1, pleochroic dye is contained in the respective encapsulated liquid crystal material 21 in each of the layers 2, 3, 4. In one example of the invention, the layers 2, 3, 4 may, respectively, contain yellow, cyan, and magenta color pleochroic dye. Other dyes may be used, as well. However, it is preferred that each liquid crystal color layer contain only a single color dye or a single mixture of dyes. In an alternative arrangement, different portions of respective liquid crystal color layers may contain different respective dyes or mixtures thereof.

In a liquid crystal color display 1 illustrated in FIG. 1 (and similarly shown in FIG. 6) in which the liquid crystal color layer 2 contains yellow pleochroic dye; the liquid crystal color layer 3 contains cyan color pleochroic dye; and the liquid crystal color layer 4 contains magenta color pleochroic dye; by selectively applying or not an electric field to respective portions of respective liquid crystal color layers, a multicolor output of the transmitted light 10 selectively can be achieved. When the encapsulated liquid crystal material 21 in the yellow dyed liquid crystal color layer 2 is in the field-on condition, such layer becomes substantially optically transparent and will have minimum affect on the light incident thereon and, accordingly, transmitted therethrough. However, when the liquid crystal material 21 in the color layer 2 is in the field-off condition, the light transmitted therethrough will be colored, dyed, or filtered in such a way that it tends to appear yellow. Accordingly, with the liquid crystal material in the color layers 3 and 4 in a field-on condition so that the same is effectively optically transparent, and the liquid crystal material in the yellow color layer 2 in the field-off condition, for white incident light 9, the output light 26 will be yellow in color. It will be appreciated that the pleochroic dye in the respective color layers 2, 3, 4 functions to absorb a specific color or colors of light when in the field-off condition. Accordingly, operation of the liquid crystal color display 1 may be analogized to the operation of negative film used in color photography; and the construction and operation of the display 1 may be similar to the construction and operation of such negative film employed in color photography.

Table III below depicts several possible combinations of field-on and field-off conditions of respective portions of the liquid crystal color layers 2, 3, 4 and as a function of the particular combination of field-on/field-off conditions and white incident light 9, the color of the output light 10.

TABLE III

|  | Green | Magenta | Red | White | Black | Blue |
| --- | --- | --- | --- | --- | --- | --- |
| Yellow | Off | On | Off | On | Off | On |
| Cyan | Off | On | On | On | Off | Off |
| Magenta | On | Off | Off | On | Off | Off |

An example of yellow pleochroic dye would be Sudan-I; of cyan would be Indophenol Blue; and of magenta would be D-37. Other pleochroic dyes also would function according to the invention; an example would be red pleochroic dye Sudan-III.

Along the vertical axis shown at the left hand side of Table III, the color of the respective liquid crystal layers 2, 3, 4, is represented. Along the horizontal axis at the top of Table III is represented the color of the output light 10 as a function of white input light 9 and the field-off or field-on state of the liquid crystal in a given layer 2, 3, 4 in a serial optical path, such as that represented at 5 or 6, directly through the display 1. Accordingly, to obtain a green color output light 10, the yellow dyed liquid crystal material 21 in a layer 2 proximate the path 5 should be in the field-off condition; and that in the layer 3 proximate the path 5 should be in the field-off condition; and that in the layer 4 proximate the path 5 should be in the field-on condition. It will be appreciated that those colors, as well as others, shown in Table III, as well as white and black, can be achieved by selectively applying or not an electric field to respective portions of liquid crystal color layers 2, 3, 4.

By selectively energizing, i.e. applying an electric potential across, respective electrodes in the display 1, it is possible to obtain output light 10 along optical path 5 of one color and output light 10a along another optical path 6 of a different color simultaneously. The electrodes in electrode layers 45 and 46 of the display 1 are located between the liquid crystal color layers on opposite sides thereof and are of the singular shared type cooperating with each other and respectively with non-shared or dedicated electrodes in the electrode layers 44 and 47 to apply, when necessary, an electric field across respective portions of respective liquid crystal color layers to achieve the desired optical output of the display 1. Electrical circuitry for energizing the respective electrodes is not shown in detail; however, it will be appreciated that such circuitry may include an electrical power supply, switching circuitry, and electrical connections to respective electrodes selectively to energize the same to apply an electric field or not to the liquid crystal material between a respective pair of electrodes, as was mentioned earlier. An advantage to the shared electrode configuration of the display 1 in FIG. 1 is the minimizing of the number of electrodes and, therefore, the minimizing of any optical attenuation (absorption) effected by the electrode(s) on light incident thereon. Although the electrodes are substantially optically transparent, it is the usual case that the electrode layer will not be 100% transmissive.

Referring to FIG. 9, a modified liquid crystal color display 1' which uses a separate pair of non-shared or dedicated electrode layers for each liquid crystal layer is illustrated. The display 1' is similar to the display 1 described above with reference to FIG. 1, and, therefore, primed reference numerals designate parts in the display 1' corresponding to similarly identified parts in the display 1.

The display 1' includes a support 7', liquid crystal color layers 2', 3', 4', and a protective layer 8'. Additionally, the liquid crystal color display 1' includes an electrode layer 44' between the support 7' and color layer 2' and an electrode layer 47' between the color layer 3' and the protective sheet 8'. However, in contrast to the liquid crystal color display 1, the color display 1' does not require the sharing of electrodes. Therefore, between the liquid crystal color layers 2', 3', there are two electrode layers 60, 61 separated by an electrically insulating or non-conductive material 62, all of which are optically transparent or at least substantially optically transparent; and between the liquid crystal color layers 3', 4', are electrode layers 63, 64 and an optically transparent insulator 65. The electrode layers 60, 63 have horizontal electrode strips, as is shown in end view in FIG. 9, similar to the electrode strip arrangement illustrated in FIG. 8; and the electrode layers 61, 64 have vertical electrode strips shown in end view in FIG. 9 arranged in a way similar to the electrode strips illustrated in FIG. 7. It will be appreciated that other electrode patterns, arrangements and configurations may be employed consistent with the invention to effect application selectively of electric field to certain portions of respective liquid crystal color layers in the display 1'.

In operation of the liquid crystal color display 1', respective electrodes in layers 44', 60 may be selectively energized or not to effect application or not of an electric field at respective portions of the liquid crystal color layer 2'. Likewise, respective electrode strips in the electrode layers 61, 63 may be selectively energized or not to apply or not electric field to respective portions of the liquid crystal color layer 3', and the same is true with respect to the electrodes in the electrode layers 47', 64 with respect to the liquid crystal color layer 4'. Thus, it will be appreciated that in the liquid crystal color display 1', each liquid crystal color layer 2', 3', 4', has a dedicated respective pair of electrode layers for affecting the encapsulated liquid crystal material in the color layer. Operation of the liquid crystal color display 1' in FIG. 9 is similar to the operation of the liquid crystal color display 1 described above with reference to FIG. 1. However, the light traveling through the display 1' from the incident light 9' to the output light 10' will have to pass through several additional electrode layers and insulation layers relative to the fewer number of layers required in the display 1 of FIG. 1. Operation of the liquid crystal color display 1', though, will follow the responses depicted in Table III above, and it will be appreciated that the output light 10' from different respective portions of the display 1' may be colored differently, depending on the energization or not of respective electrodes and the parallel aligned field-on condition or curvilinearly aligned, distorted condition of the encapsulated liquid crystal material through which light must travel to be emitted as output light 10'.

Examples 1-3 describe the making of three differently dyed encapsulated liquid crystal materials. Each such material may be used, for example, in a respective liquid crystal color layer of a liquid crystal color display as is illustrated and described herein.

EXAMPLE 1

This is an example of making pleochroic dyed encapsulated liquid crystal, which absorbs blue light and transmits green and red light.

1. Materials a. 900 grams of 7% high viscosity fully hydrolysed polymer (SA-72 of the former American Liquid Xtal Chemical Corp. (formerly in Kent, Ohio, U.S.A., - such material being 1 phenylazo-2-naphthol), b. 100 grams of 8250 (an ester) nematic liquid crystal material also of American Liquid Xtal Chemical Corp., c. 0.05 gram of C26100 Sudan-I (a yellow dye)—(absorbs blue light and allows green and red light to go through), the latter ingredient being a pleochroic dye.

2. Method

The polymer was weighed out in a beaker. The liquid crystal was weighed out, was placed on a hot plate, and was heated slowly. The dye was weighed out on a balance and was added very slowly to the liquid crystal, being stirred until all the dye went into solution. The liquid crystal and dye solution then was filtered through a standard Millipore filtering system using 8 ml. filter paper. The filtered liquid crystal and dye solution was stirred into the polymer using a Teflon rod. The mixture was encapsulated by placing the same in a colloid mill that was operated at medium shear for five minutes. The emulsion produced wa pulled as a film on a conductive polyester sheet.

3. Operation

In operation of such material, upon application of a 10 volt electric field, the liquid crystal structure began to align, and at 40 volts the liquid crystal reached saturation and maximum optical transmissivity.

EXAMPLE 2

This is an example of making pleochroic dyed encapsulated liquid crystal which absorbs red light and transmits green and blue light.

Carry out the steps of Example 1 using the materials of Example 1 except substitute 0.5 gram of indophenol blue, (a cyan dye-red absorber and green and blue transmitter), the latter ingredient being a pleochroic dye, for the Sudan-I dye of Example 1. Operation was the same as in Example 1 except for the color of filtered light.

EXAMPLE 3

This is an example of making pleochroic dyed encapsulated liquid crystal, which absorbs green light and transmits blue and red light.

1. Materials a. 4 grams of 20% medium viscosity partly hydrolysed polymer (such as 405 identified in Table I of Fergason application Ser. No. 477,242).

b. 2 grams of 8250 nematic liquid crystal material.

c. 0.08 gram of D-37 magenta pleochroic dye (a proprietary pleochroic dye of E. Merck of West Germany, which absorbs green light and transmits blue and red light).

2. Method

The polymer was weighed out in a beaker. The liquid crystal was weighed out, was placed on a hot plate, and was heated slowly. The dye was weighed out on a balance and was added very slowly to the liquid crystal, being stirred until all the dye went into solution. The liquid crystal and dye solution then was filtered through a standard Millipore filtering system using 8 ml. filter paper. The filtered liquid crystal and dye solution was stirred into the polymer using a Teflon rod. The mixture was encapsulated by placing the same in a colloid mill that was operated at medium shear for five minutes. A slide was taken using a Teflon rod, and upon inspection showed medium size capsules of about 3 to 4 microns in diameter. The material was filtered through a Millipore screen filter, and another slide was taken; on inspection there was very little change in capsule size from the first-mentioned inspection. The emulsion produced was pulled as a film on a conductive polyester sheet using a doctor blade set at a 5 mil gap.

3. Operation

In operation of such material, upon application of a 10 volt electric field, the liquid crystal structure began to align, and at about 40 to 60 volts the liquid crystal reached full on or saturation and maximum optical transmissivity.

A multicolor device can be made using any two or more of the dyed encapsulated liquid crystal materials mentioned above in Examples 1-3 according to the invention to achieve different respective color combinations, as may be desired. Also, any two liquid crystal materials, each having a different turn on voltage or frequency may be used according to the invention, each being preferably dyed with a different respective pleochroic dye. The multicolor device may be either voltage responsive, frequency responsive, or both, and may, if desired, use separate pairs of electrodes or shared electrodes, or both.

EXAMPLE 4

This is an example of operation of a multicolor liquid crystal display, according to the invention, having two liquid crystal color layers for example respectively formed according to Examples 1-3.

Red dye (either Sudan-III or Sudan-IV) was used in one layer of encapsulated liquid crystal material of a multicolor optical display device of the invention, and indophenol blue was in the other layer of encapsulated liquid crystal. The dyes, as preferably is the case in the several examples included in this disclosure, were pleochroic. In operation, when both layers were off, the device or area thereof which was off, was black; with the red off and blue on, the device or area was red; with the blue on and red off, the device or area was blue; and with both layers on, the device or area was generally clear or transparent. (Note that "off" means the liquid crystal is in distorted or curvilinearly aligned phase and the dye therein is absorbing; "on" means the liquid crystal is aligned with the applied field and it and the dye therein are substantially optically transparent with no or minimal color absorption or filtering.)

This example would be operational regardless of what method or technique disclosed herein is employed to turn on the respective liquid crystal layers together or independently. For example, either separate electrodes for each layer may be used; a shared electrode arrangement may be used whereby the electrode between the two layers is shared; and/or the voltage and/or frequency discrimination procedures described herein may be used for the purpose.

In FIG. 10 is illustrated a front view of a liquid crystal color display 70 which may be of the type designated 1 in FIG. 1 or designated 1' in FIG. 9. The size selected for the display 70, i.e. the cross-sectional area of the viewing side or surface thereof, may be substantially unlimited. Exemplary sizes may be from smaller than one square inch of area for the viewable or observable surface 71, i.e. the surface ordinarily viewed by an observer, to several square inches, to television size (from small screen size to large screen size), to billboard size, etc. Accordingly, exemplary uses of the liquid crystal color display 70 would be small size displays, television, motion picture-type displays, billboard displays, and so on. As is seen in FIG. 10, there are illustrated a number of pixel-like areas, such as those designated 72, 73, 74, which represent respective portions of liquid crystal color layers in the display 70 where respective crossed electrodes, such as electrodes 44i, 45i (FIG. 10) or electrodes 44a, 45a (FIGS. 7 and 8) cross each other on opposite sides of at least one liquid crystal color layer, cf. the description above concerning the portion of liquid crystal color layer 2 located between portions 51, 52 or electrode strips 44a, 45a (FIGS. 6-8). Behind each pixel-like area viewable at the observable surface 71 of the liquid crystal color display 70 are the respective optically aligned portions of several respective liquid crystal color layers, such as the layers 2, 3, 4 of FIG. 6 or 2', 3', 4' of FIG. 9.

Associated with the liquid crystal color display 70 in FIG. 10 is electrical circuitry 75, the purpose of which is to energize (or not) respective electrodes of the display 70 selectively to apply (or not) an electric field to a particular portion, e.g. that behind one of the pixel-like areas 72, 73, 74, of respective liquid crystal color layers thereby to create a desired image, whether fixed or moving, appearing at the observable surface 71. In FIG. 10 two exemplary electrode strips 44i, 45i are illustrated. It will be appreciated that the circuit 75 may be coupled to all of the electrodes, such as the multiple electrodes shown in FIGS. 1 and 6-9, employed in the liquid crystal color display 70 to effect production of a fixed or moving image by applying and maintaining or varying the application of electric field at various portions of the overall liquid crystal color display 70 to achieve at each of the pixel-like portions 72, 73, 74, etc., a light output of a color determined according to the above-described principles and, for example, the combinations set forth in Table III above. The pixel-like areas may be relatively large or small, depending upon the desired resolution required for the liquid crystal color display 70, and depending on whether or not merging of colors is desired in an additive fashion at the observable surface 71.

The exemplary circuit 75 includes an input circuit 76 for receiving an input signal, such as a video signal, for example having luminence and chromaticity information; in this example the display 70 may be employed as a color television screen, monitor, etc., and the circuitry 75 similarly could be employed with the display 70 for producing a color optical output of a physical size larger than conventional television screen or large screen television size. The input circuit 76 is coupled to a decode or demodulate circuit 77, which separates the chromaticity and luminence information and delivers appropriately responsive output signals to driver circuit 78. The driver circuit 78 may amplify and/or synchronize the information received from the circuit 77 and then couples the same to drive a scanning circuit 79. It is the scanning circuit 79, then, that preferably repetitively addresses or scans the individual pixel-like portions of respective liquid crystal color layers located behind the pixel-like areas 72, 73, 74, etc. selectively to apply (or not) an electric field across a given pixel-like portion of a particular liquid crystal color layer, e.g. the portion of the liquid crystal color layer 2 (FIG. 6) bounded or aligned with the portions 51, 52 of the electrode strips shown in FIGS. 7 and 8, and to control the magnitude of any applied electric field. Such scanning or addressing may be similar to the type of scanning or addressing encountered in conventional color television picture systems.

For the purpose of background information, the individual circuits 76–79 may be of the type and/or may operate according to the type disclosed, for example, in U.S. Pat. Nos. 3,627,924; 3,636,244; and 3,639,685; the disclosures of which hereby are incorporated in their entireties by reference. In particular, the latter two patents directly relate to color television signal decoding and utilization in a color television system, and the first-mentioned patent discloses a system for scanning electroluminescent points in an overall electroluminescent array. Such scanning may be employed in accordance with the present invention, and such signal usage and coding may be employed, too, according to the present invention to achieve the desired multicolored display output from the liquid crystal color display 70.

The liquid crystal color display 70 as driven by the circuitry 75 may operate in a truly subtractive mode in which it is intended that only the color produced by a given pixel 72, 73, 74, etc. will have an optical influence on the observer—the pixel size would be relatively large in this case e.g. so as not to produce substantial color addition when viewed relatively close up. The subtractive color definition is, of course, a function of the optical filtering effected as input light 9 (FIG. 1) is transmitted through the various layers of the display 70 and ultimately is emitted as output light 10. Alternatively, the size of the individual pixels 72, 73, 74, etc. of the display 70 may be relatively small so that additive color operation, such as that disclosed in copending U.S. Pat. application Ser. No. 480,461 mentioned above is effected. It will be appreciated that the display 70 may be illuminated by ambient illumination from the non-viewing side or by an additional light source provided at the non-viewing side.

The liquid crystal color displays 1, 1' and 70, as well as the other displays disclosed herein, may be employed for a variety of purposes including, for example, to effect color display of data, characters, information, picures, etc. or simply to control light, on both small and large scale. Exemplary pleochroic dyes and combinations thereof to effect particular color outputs are mentioned above, for example in connection with Table III, but it will be appreciated that other dyes and color filtering combinations, including fewer or more than three dyes described in detail above in the preferred embodiment, may be employed according to the invention. The invention may be used to display over a long period of time a single image or picture or may be employed to produce a moving picture type of output. The output itself may be viewed directly, photographed, projected, etc.

As is seen in FIG. 11, an additive may be used in the liquid crystal to expedite return to distorted alignment. In FIG. 11, an encapsulated liquid crystal 80 is shown including a capsule wall 81 having operationally nematic liquid crystal material 82 in the interior volume 83 thereof. An exemplary additive, namely a cholesteric chiral additive 84, is in solution with the liquid crystal material 82, although the additive is shown for facility of illustration at a central location in the capsule volume 83 because the function thereof primarily is with respect to the liquid crystal material remote from the capsule wall. The encapsulated liquid crystal 80 is shown in field-off, distorted, curvilinearly aligned condition, mode or phase with the liquid crystal material distorted in the manner described above. The liquid crystal material most proximate the wall of the capsule tends to be distorted to a shape curved like the inner boundary of that wall (or generally normal thereto). The chiral additive 84 tends to expedite return of the operationally nematic liquid crystal material more proximate the central portion of the capsule to the curvilinearly aligned phase upon the removal of an electric field.

The encapsulated liquid crystal material employed in the several embodiments of the invention may include fluidically interconnected capsules of the type described, for example, in the above-mentioned copending U.S. application Ser. No. 585,883. Interconnected volumes of encapsulated liquid crystal material are illustrated at 90 in FIG. 12. The curvilinearly aligned phase of the liquid crystal material contained in such volumes may be oriented generally parallel to the capsule walls or normal with respect thereto (radial with respect to the center of the capsule).

In FIG. 12 only two interconnected volumes are shown, but it will be appreciated that individual volumes may be connected to one or more other such volume(s). The encapsulated liquid crystal material 80 (FIG. 11) and/or 90 (FIG. 12) may be employed in the various embodiments of the invention described in detail above.

As was mentioned above, an advantage of sharing electrodes, e.g. in the display 1 of FIG. 1, is the minimizing of optical absorption by the electrodes. The use of a single pair of electrodes to apply electric field to two differently dyed liquid crystal color layers, e.g. layers 2, 3 of FIG. 1 would further reduce the electrode requirements for a multicolor display. In such case, though, a discrimination function is needed to determine which layer(s) is (are) to turn on in response to a particular prescribed input, e.g. electric field.

Turning now to FIG. 13, such a multilayer, multicolor shared (two) electrode liquid crystal display 100 according to an embodiment of the invention is illustrated. The display 100 is generally similar to the display 1 (FIG. 1) and may include various one or more of the several features of the invention described herein. Uniquely, though, the display 100 includes a pair of liquid crystal layers 2, 3 that contain different pleochroic dye, e.g. magenta in layer 2 and cyan in layer 3; that are not separated by an electrode; and that share a single pair of electrodes (or electrode strips) 44, 46'. (Electrode 46' is analogous to electrode 46 in FIG. 1, but is shown generally crossed or perpendicular to the direction of electrode 44 for the same reason that various electrodes are shown and described above in crossed relation.) The layers 2, 3 meet at an interface 101 and are arranged in optical serial relation to the optical paths 5, 6 so as to affect incident light 9. (Although only two layers 2, 3 are shown sharing a pair of electrodes 44, 46' in FIG. 13, more than two differently dyed layers may be used.) Each of the electrodes 44, 46' may be plural strips of electrodes, as is described above, to produce a static or dynamic multicolor output by selective energization of respective electrode strips.

The layers 2, 3 may be pulled separately on the support medium 7. For example, the layer 2 may be pulled first directly on the electrode layer 44 and support 7. After the layer 2 has adequately cured, the layer 3 may be pulled on top of layer 2, and then the electrode layer 46' may be applied. Other techniques also may be used to form the display 100.

The layers 2, 3 preferably have at least one different electrical characteristic, e.g. frequency response, voltage threshold requirement to align with respect to an applied field, etc., to discriminate the prescribed input thereto, as is described in further detail below. For example, the liquid crystal, and thus the pleochroic dye, in layer 2 may respond, e.g. align, with respect to an electric field applied at one threshold voltage level, say 10 volts; and the layer 3 may be similarly responsive only when the voltage exceeds a second threshold of, say, 20 volts. Therefore, in response to an electric field applied by electrodes 44, 46' below the lower threshold or in the absence of such field, incident light 9 (e.g. white light) would be filtered by both layers 2, 3; above the first threshold but below the second threshold, primarily only the layer 3 would effect filtering—the layer 2 then being preferably substantially transparent; and above the second threshold, neither layer 2 nor layer 3 would effect filtering.

The display 100 is capable of producing multicolor output using only the two terminals, i.e. connections of the electrodes 44, 46' or respective strips thereof to a single power source, thus simplifying the display. An important advantage of the display 100 eliminating the need for an electrode between the layers 2, 3 is the eliminating of the optical absorption of such electrode and the corresponding brightening of the output from the display.

Discriminating the electric field input to both layers 2, 3 as a function of the difference in voltage response of the liquid crystal layers 2, 3 in the display 100 can be achieved by using different liquid crystal materials that have different respective dielectric anisotropy characteristics in the respective layers 2, 3. Thus, for example, the 10% material (item 1 in Table I above) has one dielectric anisotropy characteristic making the same responsive to a relatively high voltage; and the 40% material (item 3 in Table I) has a different dielectric anisotropy characteristic, making the same responsive to a lower voltage. Therefore, the layer 2 may be comprised of the 40% material containing, say, magneta dye, and the layer 3 may be comprised of the 10% material containing, say, cyan dye. Accordingly, below the first threshold, the light output 10 or 10a would be blue if the incident light 9 were white (see Table III above); above the first but below the second threshold, the light output would be cyan; and above the second the output would be white-this assuming absence or transparency of layer 4 in the display 100.

Another example of such use of display 100 would be to include Sudan-III or Sudan-IV dye, each of which is red, in the 10% cyano liquid crystal material (item 1 in Table I) and Indophenyl Blue dye, which is a cyan dye, in the 40% cyano-liquid crystal material (item 3 in Table I). Since the red and cyan dyes are complementary, the light output is black when the liquid crystal in the layers 2 and 3 is in field-off curvilinearly aligned condition or mode. Above the first threshold voltage, the 40% material turns on and the light output from the display becomes red due to filtering by the Sudan-III or Sudan-IV dye. Above the second threshold no filtering occurs and the light output from the display is white, i.e. the display is clear.

Preferably the layers 2, 3 in display 100 are electrically matched so that the voltage applied thereto between the electrodes 44, 46' is divided substantially equally for simplicity of various operational considerations. However, as is described further below, since the dielectric constants and dielectric anisotropy of the different liquid crystal materials in the different layers 2, 3 are different, it may be necessary to make one layer thicker than the other to achieve the desired electrical characteristics, e.g. generally equal voltage drop across the layers.

As is shown in FIG. 14, a modified display 100' like the display 100 has an additional liquid crystal color layer 4. The layer 4 can perform selected further filtering of light by the contained/encapsulated liquid crystal therein; preferably the layer 4 includes a pleochroic dye different in color from the dye in the layers 2, 3. Electrodes 47' (like the electrode(s) 47 but preferably crossed relative to electrode strips in electrode 46') cooperate with electrodes 46' to apply electric field to the liquid crystal in layer 4, as above. Color output would follow Table III above, for example.

The display 100' may be made in the same way as the display 100, but with the layer 4 added above the electrode layer 46' followed by the application of the electrode layer 47'. Other techniques also may be used to make the display 100'.

It is noted that the various displays herein may include more than two or three color layers of liquid crystal material.

STRONG CAPSULES

Applicant has discovered that capsule-like environments for the dyed liquid crystal material can be formed in such a way as to maintain substantial isolation of the liquid crystal in one capsule from the liquid crystal in another capsule or otherwise in contact with the exterior of the first-mentioned capsule. Such strong capsules defining volumes of contained liquid crystal may be used in the several embodiments of the invention.

In particular, such capsules can be formed, for example, by a condensation reaction, more preferably by a polycondensation reaction, and most preferably by a reaction that yields a cross-linking or cross-linking type result. In a preferred embodiment such capsules are formed from a solution of the liquid crystal material and a cross-linkable polymeric material, on the one hand, and another cross-linkable polymeric material on the other hand; the two polymeric materials are reactable to effect a cross-linking of the polymer, especially at the surface, to form a capsule which is water-insoluble and water-impermeable. When the liquid crystal material and first cross-linkable polymer material are not intersoluble, a solvent such as chloroform can be utilized. Such resulting cross-linked polymer containment medium has substantial isolating characteristics so as to maintain the dyed liquid crystal therein substantially isolated from that in other capsules.

Advantages of such isolation are apparent from the further description below. However, it will be realized that such isolation improves longevity of a liquid crystal display employing such materials; such material also avoids deterioration due to external environments, water, humidity, dirt, chemicals, etc.

In the preferred embodiment of the invention, such cross-linking is achieved by mixing a maleic anhydride derived copolymer, for example one known as poly(-methyl vinyl ether/maleic anhydride) made and/or sold by GAF Corporation under the identification Gantrez 169, with the dyed liquid crystal material. The dyed material may be one of the type described in the several recipes in Table I above or the 8250 material also described above. A solvent, such as chloroform, also may be added to facilitate the dissolving of the maleic anhydride polymer in the liquid crystal material itself. The solution just mentioned is mixed with polyvinyl alcohol, and a cross-linking reaction occurs to form a water insoluble polymer.

FIG. 15 shows the formation of a capsule using liquid crystal and Gantrez 169 in the center 150; and PVA and water 151 about the outside. The cross-linking reaction occurs at the boundary of the liquid crystal and Gantrez mixture 150 to form a capsule. The result is the formation of an insoluble film or wall confining the liquid crystal material and dye within the capsule. The film is insoluble in both the liquid crystal and in the water.

It is due to the observation of the film and to the observing of water insolubility of the capsules that actual cross-linking is believed to occur when the two mentioned polymer materials react. For these reasons the capsule walls are referred to as being formed of cross-linked material. However, it is important to note that whether or not classical cross-linking occurs, the result of the invention yields a strong, substantially water insoluble capsule.

Thus, fundamentally the strong capsules are formed by a pair of reactants, one of which is water soluble and the other of which is soluble in the liquid crystal material, and those reactants together undergo a polycondensation reaction.

EXAMPLE 5

This example demonstrates the use of cross-linking with dyed liquid crystal material.

A poly(methyl vinyl ether/maleic anhydride), namely 2% Gantrez 169, available from GAF and which is a low molecular weight polyvinylmethoxymaleic anhydride, was dissolved in a 40% cyano liquid crystal material, which is an ester defined in Table I above. 20% chloroform also was added in the mixture as a solvent. To such solution a 22% solution of 20/30 polyvinyl alcohol (the remainder being water), was then mixed. The resulting mixture was allowed to sit for about one hour, and the result was a suspension of liquid crystal in capsules in which the wall was formed by the product of the cross-linking reaction between the maleic anhydride e moeity and the PVA.

It is important that the liquid crystal, Gantrez (or other cross-linkable polymer) and chloroform be intersoluble. Various ester liquid crystal materials may be used, such as those identified in Table I and the 8250 material mentioned above. Also other materials may be used as long as the cross-linking is achieved to provide strength, durability and insolubility of the capsules.

The foregoing chemical cross-linking technique can be used with some of the dyes, such as D-54 and indophenol blue, which are compatible with the several materials used. An object of the cross-linking technique is to isolate the liquid crystal in a strong capsule environment resulting in a product that has a long shelf life and operational life. Importantly, the foregoing technique can be used to produce two or more different groups of capsules, respectively containing different liquid crystal materials, one liquid crystal material containing one dye and the same or another liquid crystal material containing a different dye, etc. The groups of capsules can be mixed together without destroying the integrity of the individual capsules; thus, the individual liquid crystal materials and dyes, if used, remain isolated from each other although individual capsules of respective liquid crystal material themselves are mixed.

The materials and procedures of Examples 1-4 may be practiced using the cross-linking or polycondensation reaction technique of Example 5 as long as the desired cross-linking or polycondensation reaction occurs. Exemplary cross-linking producing materials or condensation agents may be an aldehyde, a dialdehyde, a polycarboxylic acid or a polycarboxylic anhydride; and more specifically may be at least one of the group gluteral aldehyde, dioxal glycoxal acetaldehyde, formaldehyde, phthalic anhydride, maleic anhydride, poly(-methyl vinyl ether/maleic anhydride), and polyvinylmethoxymaleic anhydride. Further condensation agents would be diisocyanates, such as toluene diisocyanate, hexolmetholene diisocyanate, and others that will undergo polycondensation reaction with alcohols, for example.

The water soluble polymer part of the ingredients to form the strong capsules may be, for example, the mentioned polyvinyl alcohol, or any polyhedric alcohol. Examples would be ethylene glycol and water, propylene glycol and water, or glycerine and water.

It will be appreciated that other techniques may be employed to achieve the cross-linked or otherwise strong and relatively insoluble volumes of liquid crystal for use in the invention. Other materials also may be used for the liquid crystal material, dye, containment medium, cross-linkable polymer, e.g. maleic anhydride containing copolymer, etc. to achieve the desired cross-linked, strong, relatively insoluble capsules or in any event volumes containing the liquid crystal material, whether or not dyed. Also, the polyvinyl alcohol can be replaced by other polymers which can cross link the cross-linkable polymer in the solution.

In FIG. 16 is shown an example of a multicolor display device 200 employing such a mixture 201 of a group or plurality of red-dyed liquid crystal capsules 202 and a group or plurality of green-dyed liquid crystal capsules 203 is shown. The capsules 202, 203 are the strong capsules of cross-linked materials described above, and, therefore, such capsules provide adequate isolation of one dyed liquid crystal material from the other. Since the capsules 202, 203 are mixed and only one pair of electrodes 44, 46' (or electrode strips) is used, a means to discriminate the electric field input, e.g. according to magnitude, ordinarily would be provided. Thus, using liquid crystal materials that have different operational voltage characteristics as was described with respect to the display 100 of FIG. 13, the liquid crystal material in one or both of the groups of capsules 202, 203 can be aligned or not and a multicolor output can be achieved. For white input light, the actual color of the output light would depend on which, if any, of the liquid crystal capsules 202, 203 is in field-on parallel aligned condition and which, if any, is in curvilinear aligned condition.

Some materials, such as some pleochroic dyes, contain alcohol groups and will react with the Gantrez. Therefore, using such materials, the described cross-linking would not occur and the so-called strong, water insoluble capsules of cross-linked polyester material would not be obtainable. In such case, it may be necessary to maintain suitable isolation between respective dyed liquid crystal materials, e.g. by maintaining separate layers of the same. For example, one layer of volumes of dyed liquid crystal material in an emulsion of PVA or other containment medium could be pulled on a support; after such emulsion has cured or otherwise stabilized, a second layer of a differently dyed liquid crystal material in a containment medium could be pulled on top of the first-mentioned one; and so on. Alternatively, one or more electrode layers, transparent film layers, etc., could be located between the dyed liquid crystal layers.

Alternatively, if it is not possible to use the strong cross-linked capsules, say due to reaction with the dye employed in one layer, but it is possible to use such strong capsules for the other layer of a multicolor display device, then such a display using both an emulsion of liquid crystal and dye in a containment medium, e.g. PVA, and the strong capsules according to the invention may be formed. Such a display 210 is illustrated in FIG. 17 using one layer 211 of actual cross-linked or strong capsules 212 of dyed liquid crystal and a separate layer 213 of PVA 214/dyed liquid crystal 215 which form an emulsion 216. (Each layer may include more than one layers of capsules or volumes of dyed liquid crystal material, as is seen in FIG. 17.) The walls of the capsules 212 effect the needed isolation to prevent the two different respective liquid crystal and dye mixtures from mixing with each other. It also may be possible to mix the capsules 212 in with the emulsion 216 to form a generally homogeneous layer of capsules containing one liquid crystal material and dye therein and further volumes of the other liquid crystal material and dye essentially contained in the overally containment medium, e.g. PVA.

For discriminating between different magnitude or voltage levels of electric field simultaneously applied to differently dyed liquid crystal materials in separate volumes, e.g. in the displays 100, 100', 200, 210 described above, the use of two liquid crystal materials that have different respective field-on alignment threshold voltage levels may be used. One example of such voltage threshold discrimination capability is mentioned above in relation to FIGS. 12 and 13, namely, the proposed use of the 10% and 40% cyano liquid crystal materials identified in Table I above. Each of such liquid crystal materials has a different voltage threshold which is required before the liquid crystal will turn on to parallel alignment with respect to the applied field overcoming the force of the capsule or volume containing the liquid crystal material and tending to force the same to the curvilinearly aligned or distorted structure. (Such difference in threshold voltage may be a function of capsule or volume size, as was mentioned above and is described further below.)

The use of at least one cross-over liquid crystal material is another way to effect discrimination as a function of frequency and voltage of electric field applied by a single pair of electrodes.

Cross-over Liquid Crystal Material

A cross-over liquid crystal material is one that has a characteristic that changes as a function of input, such as, in the preferred embodiment, two different dielectric anisotropies—one dielectric anisotropy, e.g. negative, at one frequency (say at a low frequency) of applied electric field and a second different dielectric anisotropy, e.g. positive, at a different frequency (say at a high frequency). Therefore, at different frequencies of electric field one can obtain different respective operation of the liquid crystal, such as selective switching from the same liquid crystal material. An exemplary cross-over liquid crystal material that is operationally nematic is that sold under the identification ZL1-2461 liquid crystal by E. Merck, Darmstadt, West Germany.

Several properties of ZL1-2461 twisted nematic type liquid crystal material include the following: Dielectric anisotropy, delta E (E is dielectric constant, sometimes referred to as dielectric coefficient because E may change as a function of alignment or not, i.e. structure orientation of the liquid crystal, frequency, etc.), at low frequency, e.g. below about 3 KHz at room ambient temperature, is +3. In particular, $E_{parallel}$ is 7.8, and $E_{perpendicular}$ is 4.8 (parallel and perpendicular refer to ordinary and extraordinary directional considerations relative to alignment of the axis of the liquid crystal structure). Switch over frequency is 3 KHz at room ambient temperature. Switch over frequency is that frequency of the applied electric field at which the dielectric anisotropy of the cross-over liquid crystal material changes from positive to negative and vice-versa. Dielectric anisotropy at the relatively higher frequency of 10 KHz is −1.5. Optical anisotropy is relatively low, namely, delta N=0.13. (N is the index of refraction, and delta N is the difference between the ordinary index of refraction and the extraordinary index of refraction of the liquid crystal material.) Therefore, such 2461 material has relatively low birefringence. The 2461 liquid crystal is compatible with several other liquid crystal materials. Such compatibility is manifest in the following operative example.

The 2461 liquid crystal material matches well with the 10% cyano liquid crystal material mentioned above. Both the 2461 and the 10% cyano materials turn on (turn on means the liquid crystal structure aligns with respect to the applied field and preferably reduces scattering and/or absorption and increases optical transmission) at the same time and in response to the same magnitude electric field at low frequency. However, at high frequency (say, 10 KHz.), only the 10% cyano liquid crystal material would turn on at such magnitude of electric field; since the 2461 material would have a negative dielectric anisotrophy at high frequency it would not turn on. The cross-over material may be used in the several embodiments of the invention disclosed herein. For example, if such 2461 material were used in the red capsules 202 in the display 200 of FIG. 16 and 10% cyano liquid crystal were used in the green dyed capsules 203, operation would be, as follows:

a. No field applied-liquid crystal in both capsules 202, 203 would be distorted and red and green filtering would occur.
b. Field applied at relatively low frequency at a magnitude above the threshold voltage for both capsules 202, 203—the liquid crystal and dye in both capsules would align and incident light would be transmitted without any or substantially without any filtering.
c. Field applied at relatively high frequency at a magnitude above the voltage for both, particularly for the 10% cyano material—the 2461 liquid crystal has negative dielectric anisotropy, will not align with respect to the field, and accordingly will cause the dye therein to filter light; while the 10% cyano material remains in parallel alignment to the field so the dye therein will not effect or will only minimally effect filtering.
d. A further possibility is that the field is applied at low frequency and adequate threshold voltage to turn on the 2461 material but the voltage is inadequate to turn on the 10% cyano material—in this case only the dye in the 10% cyano liquid crystal containing volumes would effect filtering, and the 2461 liquid crystal and dye would have no or minimal filtering effect. (If the 10% cyano material and the 2461 material have the same threshold voltages at low frequency, then it may be necessary to substitute for the former a different liquid crystal having a higher threshold voltage than the 2461 material.)

Combination/compatibility of cross-over liquid crystal with other liquid crystal materials: It is not critical which of the above recipes (Table I, for example) of liquid crystal materials is used with the cross-over material. For assuring turn on at the same time at low frequency, one must use liquid crystal material that has a dielectric anisotropy which is about the same as the low frequency dielectric anisotropy as that of the 2461 liquid crystal material. For example, 10% cyano and 2461 liquid crystal materials may be used. Another example would be 2461 material and 2116-110 liquid crystal material, also by Merck. All the delta N's (optical anisotropy N is index of refraction) and delta E's match for these except that the 2461 turns off at high frequency or does not switch at high frequency because at high frequency the 2461 liquid crystal material has negative dielectric anisotropy.

CAPSULE SIZE CONSIDERATIONS

Capsule size can play an important role in accomplishing voltage discrimination function for the several layers of encapsulated liquid crystal material. The smaller the capsule, for a given liquid crystal material, the larger the voltage required to switch the liquid crystal material to aligned state. Accordingly, the same liquid crystal material can be used in each of the liquid crystal layers, but each layer is formed of capsules of different respective size. In this way voltage discrimination can be accomplished with the same liquid crystal.

Briefly referring to FIG. 18, a multicolor display device 220, according to the invention, is illustrated. Such device 220 has two layers 221, 222 of volumes or capsules 223, 224 of liquid crystal. The liquid crystal in layer 221 is dyed one color, and that in the other layer 222 is dyed a different color. The total thickness of each layer, though, preferably is the same, since the impedance and dielectric values of the layers would be the same; this helps assure balanced operation and balanced electrical and optical effects. As a result, each layer is the same thickness, has similar properties, has the same concentration dye and, thus, the same effective filtering capability. However, the liquid crystal in the layer 221 having the larger volume capsules 223 switches at a relatively lower voltage and the liquid crystal in the layer 222 of smaller volumes 224 requires a relatively greater voltage to switch on to the aligned generally transparent mode.

The above described volume/capsule size considerations, as well as the various other features of the invention may be used together to achieve the particular operational characteristics of multicolor subtractive color or serial filtering accomplished in the multicolor optical devices of the invention as are described in detail above.

Thus, it will be appreciated that using the above materials, it is possible to address different colors in a multicolor liquid crystal display using encapsulated liquid crystal materials.

EXAMPLE 6

In this example both voltage and frequency are used to discriminate the input to a pair of different liquid crystal materials. Moreover, in this example one of the dyes actually cannot be encapsulated with the Gantrez according to the method described above with the cross-linking to obtain strong capsules, because the dye contains alcohol and would react with the Gantrez.

Materials: Separate layers of encapsulated liquid crystal material, each having a different color pleochroic dye therein. Referring to FIG. 17 for this example, layer 211 has indophenol blue dye and is formed of the 5% organo liquid crystal material identified above. Layer 213 has Sudan-III (red) pleochroic dye therein and is formed of 2461 liquid crystal which is frequency dependent, vis-a-vis dielectric anisotropy. Layer 211 is comprised of strong cross-linked capsules, and layer 213 is comprised of a stable emulsion of volumes of dyed liquid crystal in a polyvinyl alcohol containment medium. The threshold level of the 5% cyano liquid crystal material to turn on/align with respect to the field exceeds that of the 2461 liquid crystal (at low frequency).

Operation: When no field is applied, both layers 211 and 213 are field-off and for incident white light input the output is dark or black. In response to an input electrical field of low voltage and low frequency, the 2461 layer turns on (liquid crystal aligns) and dye therein becomes effectively transparent, while the blue dye in the 5% material layer continues filtering to produce a blue output. At high voltage and low frequency, the 5% material turns on and the 2461 material stays on, whereupon the display is clear. At low voltage, high frequency, the 2461 material turns off and the 5% material stays on, whereupon the display produces a red output.

Advantages of such voltage/frequency discrimination by the liquid crystal material itself is that no intermediate electrode is required; absorption caused by such electrode is eliminated. Also, only two electrical terminals would be required for the multicolor device and only one single cast may be required to make the device.

Using exclusively the above-described cross-linked capsules, and consistent with the several examples described herein, a first layer of one color dyed encapsulated liquid crystal material could be cast on a support, followed by a second layer of a different color dyed encapsulated liquid crystal material, and, if desired, even a third, etc. Each liquid crystal material may be responsive to a different voltage or frequency than the other(s) to achieve discrimination of input field to produce a multicolor output. It also would be possible to mix the differently colored capsules of the strong cross-linked type to achieve a homogeneous mixture or distribution thereof. Such mixture, which would be responsive to or discriminating with respect to different switching voltages or frequencies, could be used to achieve the desired multicolor response using only a single pair of electrodes.

BALANCING ELECTRICAL CHARACTERISTICS

While, on the one hand, it is desirable to achieve the above-mentioned electric field discriminating function, on the other hand it is desirable to balance the electrical characteristics of the liquid crystal layers. In particular, it would be desirable to balance electrical impedance of the layers so that for a given input field the voltage drop across each layer would be at least about the same. Such balance facilitates operational consideration as each layer or capsule discriminates the applied electric field. Although it is possible for a multicolor display, e.g. of the type disclosed in FIG. 17, for example, to function with electrically unbalanced characteristics, the achieving of desired balance simplifies construction and operation of the display. Such balancing also may facilitate the discrimination function and may prevent possible damage to the liquid crystal material and/or containment medium due to over-driving by excessive voltage to switch one or both layers of an electrically unbalanced display.

To accomplish electrical balancing of plural liquid color layers, it may be necessary for the layers to be different thicknesses because the dielectric constants/coefficients of the different liquid crystal materials often are different. However, as one layer is made proportionally thicker than another, compensation of dye concentration, namely a reduction in dye concentration in a given layer as it is made thicker, is desirable to maintain substantial balance in the color filtering effects of the respective layers. Such balancing of dye concentration may be according to an equation for intensity I of light transmitted through a liquid crystal layer containing pleochroic dye as a function of the incident light intensity $I_o$, thickness T of the layer, and concentration B of the dye in that layer, as follows:

$$I = I_o e^{-BT}.$$

If desired, although more complex, the filtering effect of the respective layers 2, 3 and the electrical considerations could be unbalanced, e.g. by having the layers of equal thickness with dyes of the same or different concentration, etc.

The following Examples 7-9 demonstrate the aforementioned balancing considerations in liquid crystal color layers of a multicolor liquid crystal display.

EXAMPLE 7

This is an example of balancing electrical characteristics of the encapsulated liquid crystal, on the one hand, and the intensity or filtering capability of the dye, on the other hand. A multicolor device 230 embodying this example is illustrated in FIG. 19.

1. Materials a. 40% cyano liquid crystal mixture mixed with indophenol blue pleochroic dye. The concentration of dye in this first layer 231 will be one-fourth the concentration of dye used in the second layer because the thickness of this first liquid crystal layer will be four times the thickness of the second liquid crystal layer in order to achieve the desired balance of electrical characteristics between the two layers to accomplish the operation below.

b. 10% cyano liquid crystal mixture mixed with Sudan-III (red) pleochroic dye in this two dye multicolor system. However, note, as was mentioned above, the concentration of dye in the instant layer 232 will be four times the concentration of dye in the first-mentioned layer 231; but the thickness of this instant layer 232 will be only one fourth the thicnkess of the first-mentioned layer.

2. Operational effects

Due to the electrical characteristics of the liquid crystal, e.g. dielectric constants/coefficients and/or switching field voltage requirements, and the thickness of the respective layers 231, 232, the electric field applied to the display 230 will be divided substantially equally across the layers 231 and 232. The 40% cyano would switch to on or clear first, as the applied voltage increases. Subsequently, i.e. at a greater voltage, the 10% cyano material would switch on. Therefore, for increasing voltage, the following operation occurs a. Black when both unswitched.
b. Red, as the 40% cyano switches on.
c. Clear, as the 10% cyano also switches on.

The examples described herein generally will work for quite a few different dyes and dye combinations. Note that to achieve a black when both liquid crystal materials are unswitched, the colors must be true complementary colors. It is the use of such complementary colors that actually results in a true subtractive color operation. Nevertheless, operation still would proceed even if additive colors were used.

EXAMPLE 8

This example is the same as Example 7 except that a yellow (negative blue) dye and a true blue dye were used. The results for increasing voltage are, as follows:

| | |
|---|---|
| a. Both off: | Black. |
| b. One or the other on: | Yellow or blue. |
| c. Both on: | Clear. |

According to the invention, plural pleochroic dyes may be mixed to derive a dye that is a different color or has different properties relative to the constituents. For example, Sudan-I and indophenol blue pleochroic dyes may be mixed for the purpose of forming a green dye, which is used as the dye for one of the encapsulated liquid crystal materials, e.g. in the multicolor display device 200 of FIG. 16 or in the following Example 9. Currently there is no good green pleochroic dye having suitable color and longevity/non-fade characteristics, and that is why the mixture is useful.

EXAMPLE 9

This example is the same as Examples 7 and 8, except that a mixture of Sudan-I and indophenol blue pleochroic dyes were used as a green dye and D-37 magenta pleochroic dye was used as the other dye. In operation the multicolor device worked, as follows:

| a. Both off: | Black. |
|---|---|
| b. One or the other on: | Green or magenta. |
| c. Both on: | Clear. |

Note in all examples above, the dye can be mixed in either direction. Concentration of the dye plays a big part in balancing out the absorption characteristics of the materials used and of the resulting color output. These can be determined pragmatically, if desired. Importantly, though, the electrical characteristics of the layers are balanced to facilitate application of electric field and determination of the discrimination and/or other operational functions of the multicolor display device according to the invention.

TECHNICAL FIELD

It will be appreciated that the several features of the invention may be employed to produce a color output for educational, informational, entertainment, etc. purposes.

I claim:

1. A liquid crystal apparatus, comprising
plural liquid crystal display means for selectively transmitting light or scattering or absorbing light in response to selective application of a prescribed input,
said liquid crystal display means being positioned in optical serial relation,
light coloring means in at least one of said liquid crystal display means for coloring light therein,
each of said liquid crystal display means comprising plural volumes of operationally nematic liquid crystal material in a containment medium, and said light coloring means comprising respective pleochroic dye means in the liquid crystal material.

2. The apparatus of claim 1, said containment medium comprising a means for distorting the natural structure of the liquid crystal material in said volumes to cause said pleochroic dye means in said distorted liquid crystal material to color light in the liquid crystal material.

3. The apparatus of claim 2, wherein said liquid crystal display means are operative in response to an application of an electric field as said prescribed input that causes generally parallel alignment of the liquid crystal material structure to reduce coloring of light or selectively to color light by that liquid crystal material and said pleochroic dye means at which an appropriate electric field is not applied, whereby when said liquid crystal material in said plural liquid crystal display means are coloring light, subtractive coloring occurs of light transmitted through said plural liquid crystal display means, and the application of said electric field to at least one of said plural liquid crystal display means reduces the coloring of said transmitted light by said pleochroic dye therein.

4. The apparatus of claim 2, wherein said liquid crystal display means are operative in response to an application of an electric field as said prescribed input, said apparatus further including electrical input means comprising a pair of electrode means for selectively applying an electric field to only one of said liquid crystal display means.

5. The apparatus of claim 4, said electrical input means comprising a second pair of electrode means for selectively applying an electric field to only a second of said liquid crystal display means.

6. The apparatus of claim 5, further comprising generally optically transparent electrical insulating means positioned between one electrode of said pair of electrode means and one electrode of the second pair of electrode means.

7. The apparatus of claim 2, wherein said liquid crystal display means are operative in response to an application of an electric field as said prescribed input, said apparatus further including electrical input means comprising at least three electrode means selectively energizable to apply an electric field to said liquid crystal display means, a first and a second of said electrode means being positioned and operative with respect to one of said liquid crystal display means to apply an electric field thereto, and said second and a third of said electrode means being positioned and operative with respect to a second of said liquid crystal display means to apply an electric field thereto, whereby said second electrode means is shared by at least two of said liquid crystal display means.

8. The apparatus of claim 2, wherein said liquid crystal display means are operative in response to an application of an electric field as said prescribed input, said apparatus further including electrical input means comprising at least one pair of electrode means for applying an electric field to each of said liquid crystal display means, and at least one of said liquid crystal display means comprising discriminating means for discriminating at least one characteristic of said applied electric field.

9. The apparatus of claim 8, said discriminating means comprising the electrical response of the liquid crystal material in said respective liquid crystal display means.

10. The apparatus of claim 9, the electrical response being a function of the frequency of said applied electric field, and the liquid crystal material in at least one of said liquid crystal display means comprises cross-over liquid crystal material having a dielectric anisotropy as a function of said frequency of said applied electric field, and which undergoes a cross-over during operation of said apparatus.

11. The apparatus of claim 9, the electrical response being a function of the magnitude of said applied electric field, and the liquid crystal material in at least two of said liquid crystal display means having different voltage threshold response characteristics.

12. The apparatus of claim 8, said volumes of liquid crystal material of one of said liquid crystal display means and said volumes of liquid crystal material of another of said liquid crystal display means being positioned in a generally homogeneous distribution.

13. The device of claim 2, characterized in that at least two of said liquid crystal display means include said light coloring means, and the respective pleochroic dye means therein are complementary whereby when the respective pleochroic dye means are in an absorbing mode the light output is black.

14. An optical device, comprising first and second pluralities of volumes of operationally nematic liquid crystal material in a containment medium, each of said first and second pluralities of volumes respectively having a different optical characteristic selectable in response to the application and removal of a prescribed input, and each of said first and second pluralities of volumes having a different input responsive characteristic to discriminate at least one parameter of such prescribed input to effect selection of such respective optical characteristics and each of said first and second pluralities of volumes having at least a portion in optical series.

15. The device of claim 14, characterized in that said first and second pluralities of volumes of liquid crystal discriminate as a function of voltage.

16. The device of claim 15, characterized in that the dielectric anisotropy of the liquid crystal in said first and second pluralities of volumes is different to provide such voltage discrimination.

17. The device of claim 14, characterized in that said first and second pluralities of volumes of liquid crystal discriminate as a function of the frequency of an electrical input thereto.

18. The device of claim 17, further characterized in that said liquid crystal in at least one of said first and second pluralities of volumes has a cross-over dielectric anisotropy and which experiences cross-over during operation as a function of the frequency to provide the discrimination function.

19. A liquid crystal apparatus including liquid crystal in containment media for selectively affecting light as a function of a prescribed input, characterized in comprising:
  at least two groups of plural volumes of operationally nematic liquid crystal in a containment medium, the liquid crystal of one group having at least one different optical characteristic from the liquid crystal of another group; and
  at least some of a plurality of volumes of said one group being in optical series with at least some of a plurality of volumes of said another group.

20. The apparatus of claim 19, wherein the liquid crystal of the one group is further characterized in being responsive to a prescribed input to alter the optical characteristic of the one group of volumes in which said liquid crystal is contained.

21. The apparatus of claim 20, wherein said optical characteristic is color, and said at least two groups of plural volumes of liquid crystal are further characterized in respectively containing a different respective color dye.

22. The apparatus of claim 21, further characterized in that said dye comprises color pleochroic dye in said liquid crystal of the one group of volumes and another color pleochroic dye in said liquid crystal of said another group.

23. The apparatus of claim 22, further characterized in that said different color pleochroic dyes effect filtering of different color light as a function of a prescribed input to the respective liquid crystal in which said dye is contained, whereby a subtractive color filtering function is effected as a function of the path of light through said liquid crystal and the prescribed input.

24. The apparatus of claim 23, characterized in that at least two of said dyes in respective groups of volumes are complementary whereby when the at least two of said dyes are in an absorbing mode the light output is black.

25. The apparatus of claim 21, further characterized in comprising a further group of plural volumes of liquid crystal in a containment medium, said liquid crystal of said further group having an optical characteristic different from the optical characteristics of said one and another groups, at least some of said volumes of said further group being in optical series with at least some of the optically series aligned volumes of said one and another groups.

26. The apparatus of claim 25, further characterized in said optical characteristic of said liquid crystal of said further group being further characterized as color effected by pleochroic dye contained in said liquid crystal of said further group, whereby the pleochroic dyes in the liquid crystal of said groups of volumes effect multi-color filtering of transmitted light as a function of a prescribed input.

27. The apparatus of claim 26, wherein said pleochroic dyes respectively in liquid crystal of said respective groups of volumes comprise yellow dye, cyan dye, and magenta dye.

28. The apparatus of claim 19, said containment medium comprising surface means for distorting the natural structure of said liquid crystal in the absence of a prescribed input.

29. The apparatus of claim 28, wherein said liquid crystal is characterized in being responsive to an electric field to align with respect to said electric field thereby overcoming the distorting effect of said surface means.

30. The apparatus of claim 29, wherein said optical characteristic is color, said different groups of volumes of liquid crystal are further characterized in respectively containing a different respective color dye, further characterized in that said dye comprises one color pleochroic dye in said liquid crystal of one group of volumes and another color pleochroic dye in said liquid crystal of said another group, and said dye having a structure that follows the structure of said liquid crystal in which said dye is contained to filter light in the absence of a prescribed input and to reduce such filtering in the presence of the prescribed input.

31. The apparatus of claim 30, said liquid crystal being further characterized in having positive dielectric anisotropy.

32. The apparatus of claim 31, said liquid crystal being further characterized in having both positive and negative dielectric anisotropy as a function of the frequency of the electric field applied thereto.

33. The apparatus of claim 30, said liquid crystal being further characterized in having an ordinary index of refraction approximately matched to the index of refraction of the containment medium containing the liquid crystal.

34. The apparatus of claim 19, further characterized in that said containment medium has wall means defining said respective volumes of liquid crystal to distort the natural structure of the liquid crystal therein to a curvilinearly aligned phase absent a prescribed input.

35. The apparatus of claim 34, said liquid crystal further characterized in having a spatial average orientation in respective volumes thereof that is strongly curved absent a prescribed input.

36. The apparatus of claim 35, said liquid crystal being further characterized in a general parallel alignment with respect to the interface thereof with said wall means absent a prescribed input.

37. The apparatus of claim 35, said wall means being further characterized in having a smooth, relatively curved surface.

38. The apparatus of claim 19, further characterized in that the diameter of respective volumes is from about 0.3 to about 100 microns.

39. The apparatus of claim 19, further characterized in that said optical characteristic is alterable in response to a prescribed input to affect the color or intensity of light transmitted through said volumes of liquid crystal in said containment medium as a function of a prescribed input thereto.

40. The apparatus of claim 39, further characterized in that such alterable optical characteristic is color, and said liquid crystal contains a pleochroic dye therein, said volumes of liquid crystal containing such pleochroic dye being generally optically transparent in response to a prescribed input and being color filtering in the absence of such prescribed input.

41. The apparatus of claim 40, characterized in that at least two of said dyes are true complementary colors whereby when the at least two of said dyes are in an absorbing mode the light output is black.

42. The apparatus of claim 19, further characterized in that said one group of plural volumes of liquid crystal in a containment medium are arranged in one layer, and said another group of plural volumes of liquid crystal in a containment medium are arranged in another layer generally separate from but in at least partial optical serial relation with said one layer.

43. The apparatus of claim 42, wherein said one and another layers are characterized in being of substantially the same thickness.

44. The apparatus of claim 42, further characterized in comprising electrode means for applying an electric field to said liquid crystal as said prescribed input thereto and wherein said electrode means are characterized in comprising a separate pair of electrodes to apply an electric field for each respective layer.

45. The apparatus of claim 44, further comprising circuit means for selectively applying electrical energy to respective electrodes to affect the liquid crystal in said layer therebetween.

46. The apparatus of claim 19, further characterized in comprising electrode means for applying an electric field to said liquid crystal as such prescribed input thereto and wherein said electrode means is characterized in comprising one pair of electrodes for applying an electric field to the plural groups of volumes of liquid crystal.

47. The apparatus of claim 46, said groups of volumes of liquid crystal responsive to said prescribed input from said pair of electrodes being operative to discriminate said prescribed input as a function of at least one of voltage or frequency.

48. The apparatus of claim 47, wherein said liquid crystal in at least one of said groups of plural volumes is further characterized in being responsive to the frequency of an electric field applied thereto to effect such discriminating function.

49. The apparatus of claim 48, wherein said liquid crystal in at least one of said groups of volumes is further characterized in comprising a cross-over liquid crystal having a dielectric anisotropy that is a function of the frequency of an applied electric field.

50. The apparatus of claim 47, further comprising circuit means for selectively applying electrical energy to respective electrodes to affect the liquid crystal therebetween.

51. The apparatus of claim 44, said electrode means being further characterized in comprising a further electrode shared with one electrode of said pair of electrodes to apply selectively an electrical field to a further layer of a group of volumes of liquid crystal in a containment medium.

52. The apparatus of claim 19, further characterized in comprising electrode means for applying an electric field to said liquid crystal as said prescribed input thereto.

53. The apparatus of claim 52, wherein said electrode means comprises a pair of electrodes characterized in comprising a first electrode at one side of at least one layer formed of said one group of plural volumes of liquid crystal and formed of plural electrode strips and a second electrode at the other side of said at least one layer and formed of plural electrode strips, said electrode strips of said first electrode being oriented at other than a parallel direction with respect to the orientation of said electrode strips of said second electrode, whereby respectively overlapping portions of respective electrode strips of respective electrodes define respective pixels.

54. The apparatus of claim 53, further characterized in comprising circuit means for selectively applying electrical energy to respective electrode strips of said first and second electrodes to affect selectively the liquid crystal at respective pixels.

55. The apparatus of claim 52, said electrode means being further characterized in comprising at least three electrodes, one of which is shared by said at least two groups of volumes of liquid crystal and is cooperative with a second electrode to apply an electric field to said one group of volumes of liquid crystal and also is cooperative with a third electrode to apply an electric field to said another group of volumes of liquid crystal.

56. The apparatus of claim 55, wherein each of said one, second and third electrodes is characterized in comprising plural electrode strips, said electrode strips of said one electrode being oriented at other than a parallel direction with respect to the orientation of said electrode strips of said second and third electrodes, whereby respectively overlapping portions of respective electrode strips on opposite sides of a respective layer define respective pixels of said layer.

57. The apparatus of claim 56, further characterized in comprising circuit means for selectively applying electrical energy to respective electrode strips of said one, second and third electrodes to affect selectively the liquid crystal at respective pixels.

58. The apparatus of claim 52, said electrode means comprising plural electrodes, at least one of said plural electrodes being a solid electrode.

59. The apparatus of claim 19, wherein at least one of said groups of plural volumes of liquid crystal in a containment medium is further characterized in comprising an emulsion of said liquid crystal and the containment medium.

60. The apparatus of claim 19, further characterized in that at least one of said groups of volumes of liquid crystal in a containment medium is distributed in the containment medium containing a group of volumes of another liquid crystal.

61. The apparatus of claim 19, wherein liquid crystal of different groups have different dielectric anisotropies to discriminate voltage of an applied electric field to affect the optical characteristic of such liquid crystal.

62. The apparatus of claim 19, wherein said optical characteristic is color, said different groups of volumes of liquid crystal are further characterized in respectively containing a different respective color dye, said dye comprising a color pleochroic dye in said liquid crystal of said one group of volumes and another color pleochroic dye in said liquid crystal of said another group, said different color pleochroic dyes effecting filtering of different color light as a function of a prescribed input to the respective liquid crystal in which said dye is contained, whereby a subtractive color filtering function is effected as a function of the path of light through said liquid crystal and said prescribed input, and wherein said substractive color filtering of light is effected to provide a television output.

63. The apparatus of claim 19, further characterized in having pleochroic dye in at least some of the liquid crystal and wherein electrode means define with respective volumes of liquid crystal in containment media respective small size pixels that provide an additive color function.

64. The apparatus of claim 19, plural volumes of liquid crystal of said at least two groups being positioned in a generally distributed homogeneous arrangement.

65. A liquid crystal apparatus including liquid crystal in containment media for selectively affecting light as a function of a prescribed input, characterized in comprising:
at least two groups of plural volumes of operationally nematic liquid crystal in a containment medium, the liquid crystal of one group having at least one different optical characteristic from the liquid crystal of another group;
at least some of a plurality of volumes of said one group being in optical series with at least some of a plurality of volumes of said another group; and
wherein a first of said two groups of plural volumes is arranged in a first layer, and a second of said groups of plural volumes is configured as a second layer in optical series with at least part of said first layer.

66. The apparatus of claim 65, further characterized in said optical characteristic of said liquid crystal of said one group being further characterized as color effected by a pleochroic dye contained in said liquid crystal, whereby the pleochroic dyes in the liquid crystal of said groups of volumes effect multicolor filtering of transmitted light as a function of a prescribed input.

67. An optical apparatus, comprising a layer of first volumes of operationally nematic liquid crystal material and a layer of second volumes of operationally nematic liquid crystal material, said layer of first volumes having at least one operational characteristic different from said layer of second volumes for discriminating with respect to an electrical input applied to both said first and second volumes.

68. An optical device, comprising first and second pluralities of volumes of operationally nematic liquid crystal material in a containment medium, each of said first and second pluralities of volumes respectively having a different optical characteristic selectable in response to application and removal of a prescribed input, and each of said first and second pluralities of volumes having a different input responsive characteristic to discriminate at least one parameter of such prescribed input to effect selection of such respective optical characteristics.

69. A method of affecting light by liquid crystal material comprising directing incident light onto a liquid crystal apparatus having plural groups of volumes of operationally nematic liquid crystal material arranged in respective layers in a containment medium, a different respective pleochroic dye in the liquid crystal of each group of volumes, and applying an electric field to one or more portions of each optical layer thereby to determine the effect thereof on the incident light, said applying step including sharing at least one electrode by plural layers selectively to apply an electric field thereto.

70. A method of creating a dynamic color image comprising directing light toward a liquid crystal color display including plural volumes of liquid crystal material arranged in plural layers in a containment medium, said plural layers having different respective color characteristics and being oriented in optical series relationship, and selectively applying an electrical input to one or more selected portions of the respective layers to affect the structure and optical characteristics of the liquid crystal therein.

* * * * *